US008516055B2

(12) United States Patent　　　(10) Patent No.:　　US 8,516,055 B2
Hind et al.　　　　　　　　　　　(45) Date of Patent:　　Aug. 20, 2013

(54) SYSTEM AND METHOD FOR PUSHING INFORMATION FROM A HOST SYSTEM TO A MOBILE DATA COMMUNICATION DEVICE IN A WIRELESS DATA NETWORK

(75) Inventors: Hugh Hind, Waterloo (CA); Michael Knowles, Waterloo (CA); Noushad Naqvi, Waterloo (CA); David Bajar, Kitchener (CA); Ian M. Patterson, Petersburg (CA); Anthony G. Burns, Burlington (CA); Allan D. Lewis, New Dundee (CA); Gary P. Mousseau, Waterloo (CA); Mihal Lazaridis, Waterloo (CA)

(73) Assignee: Research In Motion Limited, Waterloo (CA)

( * ) Notice: Subject to any disclaimer, the term of this patent is extended or adjusted under 35 U.S.C. 154(b) by 2934 days.

(21) Appl. No.: 10/381,163
(22) PCT Filed: Aug. 29, 2001
(86) PCT No.: PCT/US01/26907
§ 371 (c)(1), (2), (4) Date: Mar. 19, 2003
(87) PCT Pub. No.: WO02/25890
PCT Pub. Date: Mar. 28, 2002

(65) Prior Publication Data
US 2004/0136358 A1　　Jul. 15, 2004

Related U.S. Application Data

(63) Continuation-in-part of application No. 09/528,495, filed on Mar. 17, 2000, which is a continuation of
(Continued)

(51) Int. Cl.
G06F 15/16　　(2006.01)
(52) U.S. Cl.
USPC ........... 709/206; 370/353; 370/352; 370/356; 370/354
(58) Field of Classification Search
None
See application file for complete search history.

(56) References Cited

U.S. PATENT DOCUMENTS 4,106,060 A　　8/1978　Chapman, Jr.
4,164,714 A　　8/1979　Swanson
(Continued)

FOREIGN PATENT DOCUMENTS

AU　　7843498　　2/1999
DE　　19961345　　12/1999
(Continued)

OTHER PUBLICATIONS

Takahashi, Y. et al.: "Communication Method with Data Compression and Encryption for Mobile Computing Environment," Proceedings of INET96, Montreal, Canada, Jun. 24-28, 1996, Transforming Our Society Now, 11 pages.
(Continued)

*Primary Examiner* — Ian N Moore
*Assistant Examiner* — Dung B Huynh
(74) *Attorney, Agent, or Firm* — The Danamraj Law Group, P.C.

(57) ABSTRACT

A system and method for redirecting data from a host system (or messaging server) to one or more mobile data communication devices via a wireless packet data network is provided in which the wireless packet data network dynamically assigns addresses to the one or more mobile data communication devices on an as-needed basis. A redirector application operating at the host system is configured by each user to continuously redirect certain data to the wireless packet data network, as the data is received (or otherwise altered) at the host system. Two methods are provided for communicating the redirected data from the network to the mobile device. In a first method, the mobile device is configured to periodically contact a store-and-forward server within the wireless network, which, when contacted, assigns a network address to the mobile device and then transmits the stored, redirected data to the mobile device. In a second method, the network transmits a connection request command to the mobile device via a parallel voice network, or via a command channel, or other type of low-bandwidth data channel. The mobile device then contacts the data network and requests a network address so that the store-and-forward server can send the redirected data to the mobile device.

24 Claims, 17 Drawing Sheets

Related U.S. Application Data application No. 09/087,623, filed on May 29, 1998, now Pat. No. 6,219,694.

(60) Provisional application No. 60/233,501, filed on Sep. 19, 2000, provisional application No. 60/237,616, filed on Oct. 3, 2000, provisional application No. 60/268,824, filed on Feb. 14, 2001.

(56) References Cited

U.S. PATENT DOCUMENTS

| | | | | |
|---|---|---|---|---|
| 4,417,349 A | | 11/1983 | Hills et al. | |
| 4,438,433 A | | 3/1984 | Smoot et al. | |
| 4,558,454 A | | 12/1985 | Hills et al. | |
| 4,644,351 A | | 2/1987 | Zabarsky et al. | |
| 4,695,880 A | | 9/1987 | Johnson et al. | |
| 4,697,281 A | | 9/1987 | O'Sullivan | |
| 4,713,780 A | | 12/1987 | Schultz et al. | |
| 4,768,087 A | | 8/1988 | Taub et al. | |
| 4,829,554 A | * | 5/1989 | Barnes et al. | 455/432.1 |
| 4,837,798 A | | 6/1989 | Cohen et al. | |
| 4,837,800 A | | 6/1989 | Freeburg et al. | |
| 4,845,658 A | | 7/1989 | Gifford | |
| 4,856,047 A | | 8/1989 | Saunders | |
| 4,928,096 A | | 5/1990 | Leonardo et al. | |
| 4,951,044 A | | 8/1990 | Nelson et al. | |
| 4,972,457 A | | 11/1990 | O'Sullivan | |
| 4,980,907 A | | 12/1990 | Raith et al. | |
| 5,008,926 A | | 4/1991 | Misholi | |
| 5,036,518 A | * | 7/1991 | Tseung | 714/748 |
| 5,043,721 A | | 8/1991 | May | |
| 5,058,431 A | | 10/1991 | Karwacki | |
| 5,068,916 A | | 11/1991 | Harrison et al. | |
| 5,086,502 A | | 2/1992 | Malcolm | |
| 5,109,384 A | * | 4/1992 | Tseung | 714/748 |
| 5,125,021 A | | 6/1992 | Lebowitz | |
| 5,127,041 A | | 6/1992 | O'Sullivan | |
| 5,128,981 A | | 7/1992 | Tsukamoto et al. | |
| 5,136,291 A | | 8/1992 | Teague | |
| 5,157,660 A | | 10/1992 | Kuwahara et al. | |
| 5,159,592 A | | 10/1992 | Perkins | |
| 5,177,680 A | | 1/1993 | Tsukino et al. | |
| 5,181,200 A | | 1/1993 | Harrison | |
| 5,210,785 A | | 5/1993 | Sato et al. | |
| 5,265,033 A | | 11/1993 | Vajk et al. | |
| 5,283,887 A | | 2/1994 | Zachery | |
| 5,293,250 A | | 3/1994 | Okumura et al. | |
| 5,299,255 A | | 3/1994 | Iwaki et al. | |
| 5,307,059 A | | 4/1994 | Connary et al. | |
| 5,313,582 A | | 5/1994 | Hendel et al. | |
| 5,315,635 A | | 5/1994 | Kane et al. | |
| 5,325,362 A | | 6/1994 | Aziz | |
| 5,333,152 A | | 7/1994 | Wilber | |
| 5,333,266 A | | 7/1994 | Boaz et al. | |
| 5,370,566 A | | 12/1994 | Mitchell, Jr. et al. | |
| 5,392,390 A | | 2/1995 | Crozier | |
| 5,406,557 A | | 4/1995 | Baudoin | |
| 5,410,543 A | | 4/1995 | Seitz et al. | |
| 5,416,473 A | | 5/1995 | Dulaney, III et al. | |
| 5,416,842 A | | 5/1995 | Aziz | |
| 5,436,960 A | | 7/1995 | Campana, Jr. et al. | |
| 5,438,611 A | | 8/1995 | Campana, Jr. et al. | |
| 5,452,356 A | | 9/1995 | Albert | |
| 5,457,680 A | * | 10/1995 | Kamm et al. | 370/332 |
| 5,479,472 A | | 12/1995 | Campana, Jr. et al. | |
| 5,487,100 A | | 1/1996 | Kane | |
| 5,490,139 A | * | 2/1996 | Baker et al. | 370/312 |
| 5,493,692 A | | 2/1996 | Theimer et al. | |
| 5,495,484 A | | 2/1996 | Self et al. | |
| 5,519,706 A | * | 5/1996 | Bantz et al. | 455/435.2 |
| 5,524,171 A | | 6/1996 | de Boisriou | |
| 5,533,026 A | * | 7/1996 | Ahmadi et al. | 370/349 |
| 5,539,810 A | * | 7/1996 | Kennedy et al. | 379/88.25 |
| 5,548,789 A | | 8/1996 | Nakanura | |
| 5,557,659 A | | 9/1996 | Hyde-Thomson | |
| 5,559,800 A | | 9/1996 | Mousseau et al. | |
| 5,572,528 A | | 11/1996 | Shuen | |
| 5,579,472 A | | 11/1996 | Keyworth, II et al. | |
| 5,588,009 A | | 12/1996 | Will | |
| 5,598,536 A | | 1/1997 | Slaughter, III et al. | |
| 5,603,054 A | | 2/1997 | Theimer et al. | |
| 5,604,491 A | | 2/1997 | Coonley et al. | |
| 5,604,788 A | | 2/1997 | Tett | |
| 5,613,108 A | | 3/1997 | Morikawa | |
| 5,617,058 A | | 4/1997 | Adrian et al. | |
| 5,625,670 A | | 4/1997 | Campana, Jr. et al. | |
| 5,627,829 A | | 5/1997 | Gleeson et al. | |
| 5,630,060 A | | 5/1997 | Tang et al. | |
| 5,631,946 A | | 5/1997 | Campana, Jr. et al. | |
| 5,633,810 A | | 5/1997 | Mandal et al. | |
| 5,638,450 A | | 6/1997 | Robson | |
| 5,647,002 A | * | 7/1997 | Brunson | 709/206 |
| 5,649,286 A | * | 7/1997 | Frerking | 455/435.1 |
| 5,655,219 A | * | 8/1997 | Jusa et al. | 455/338 |
| 5,666,530 A | | 9/1997 | Clark et al. | |
| 5,666,553 A | | 9/1997 | Crozier | |
| 5,673,031 A | | 9/1997 | Meier | |
| 5,673,322 A | | 9/1997 | Pepe et al. | |
| 5,701,423 A | | 12/1997 | Crozier | |
| 5,705,995 A | | 1/1998 | Laflin et al. | |
| 5,706,211 A | * | 1/1998 | Beletic et al. | 709/206 |
| 5,708,655 A | * | 1/1998 | Toth et al. | 370/313 |
| 5,727,202 A | | 3/1998 | Kucala | |
| 5,729,735 A | | 3/1998 | Meyering | |
| 5,729,826 A | * | 3/1998 | Gavrilovich | 455/11.1 |
| 5,737,328 A | * | 4/1998 | Norman et al. | 370/331 |
| 5,737,531 A | | 4/1998 | Ehley | |
| 5,742,905 A | | 4/1998 | Pepe et al. | |
| 5,745,689 A | | 4/1998 | Yeager et al. | |
| 5,751,960 A | | 5/1998 | Matsunaga | |
| 5,751,971 A | | 5/1998 | Dobbins et al. | |
| 5,754,954 A | | 5/1998 | Cannon et al. | |
| 5,757,901 A | | 5/1998 | Hiroshige | |
| 5,758,088 A | | 5/1998 | Bezaire et al. | |
| 5,758,150 A | | 5/1998 | Bell et al. | |
| 5,761,416 A | | 6/1998 | Mandal et al. | |
| 5,764,639 A | | 6/1998 | Staples et al. | |
| 5,764,899 A | | 6/1998 | Eggleston et al. | |
| 5,765,170 A | | 6/1998 | Morikawa | |
| 5,771,353 A | | 6/1998 | Eggleston et al. | |
| 5,781,614 A | | 7/1998 | Brunson | |
| 5,781,901 A | * | 7/1998 | Kuzma | 1/1 |
| 5,790,548 A | * | 8/1998 | Sistanizadeh et al. | 370/401 |
| 5,790,790 A | | 8/1998 | Smith et al. | |
| 5,790,974 A | | 8/1998 | Tognazzini | |
| 5,796,727 A | * | 8/1998 | Harrison et al. | 370/338 |
| 5,796,806 A | | 8/1998 | Birckbichler | |
| 5,809,415 A | | 9/1998 | Rossman | |
| 5,812,671 A | | 9/1998 | Ross, Jr. | |
| 5,812,773 A | | 9/1998 | Norin | |
| 5,812,819 A | | 9/1998 | Rodwin et al. | |
| 5,813,007 A | * | 9/1998 | Nielsen | 1/1 |
| 5,813,016 A | | 9/1998 | Sumimoto | |
| 5,815,081 A | | 9/1998 | Motohashi | |
| 5,819,172 A | | 10/1998 | Campana, Jr. et al. | |
| 5,819,284 A | | 10/1998 | Farber et al. | |
| 5,822,434 A | | 10/1998 | Caronni et al. | |
| 5,822,526 A | * | 10/1998 | Waskiewicz | 709/206 |
| 5,826,062 A | | 10/1998 | Fake, Jr. et al. | |
| 5,838,252 A | | 11/1998 | Kikinis | |
| 5,838,926 A | | 11/1998 | Yamagishi | |
| 5,844,969 A | | 12/1998 | Goldman et al. | |
| 5,845,204 A | * | 12/1998 | Chapman et al. | 455/343.1 |
| 5,850,219 A | | 12/1998 | Kumomura | |
| 5,850,444 A | | 12/1998 | Rune | |
| 5,862,321 A | | 1/1999 | Lamming et al. | |
| 5,862,325 A | | 1/1999 | Reed et al. | |
| 5,867,660 A | | 2/1999 | Schmidt et al. | |
| 5,878,434 A | | 3/1999 | Draper et al. | |
| 5,881,235 A | | 3/1999 | Mills | |
| 5,889,474 A | * | 3/1999 | LaDue | 340/825.49 |
| 5,889,845 A | | 3/1999 | Staples et al. | |
| 5,890,051 A | * | 3/1999 | Schlang et al. | 455/76 |
| 5,903,723 A | | 5/1999 | Beck et al. | |

| Patent | Date | Inventor |
|---|---|---|
| 5,905,777 A | 5/1999 | Foladare et al. |
| 5,917,629 A | 6/1999 | Hortensius et al. |
| 5,922,049 A | 7/1999 | Radia et al. |
| 5,923,848 A * | 7/1999 | Goodhand et al. ............ 709/219 |
| 5,928,329 A | 7/1999 | Clark et al. |
| 5,937,161 A | 8/1999 | Mulligan et al. |
| 5,941,954 A | 8/1999 | Kalajan |
| 5,941,956 A | 8/1999 | Shirakihara et al. |
| 5,943,426 A | 8/1999 | Frith et al. |
| 5,948,066 A | 9/1999 | Whalen et al. |
| 5,951,636 A | 9/1999 | Zerber |
| 5,953,322 A | 9/1999 | Kimball |
| 5,956,681 A | 9/1999 | Yamakita |
| 5,958,006 A | 9/1999 | Eggleston et al. |
| 5,960,406 A | 9/1999 | Rasansky et al. |
| 5,961,590 A | 10/1999 | Mendez et al. |
| 5,964,833 A | 10/1999 | Kikinis |
| 5,966,663 A | 10/1999 | Gleason |
| 5,968,126 A * | 10/1999 | Ekstrom et al. ............... 709/225 |
| 5,968,131 A | 10/1999 | Mendez et al. |
| 5,969,636 A | 10/1999 | Parvulescu et al. |
| 5,973,612 A | 10/1999 | Deo et al. |
| 5,974,180 A | 10/1999 | Schwendeman |
| 5,974,238 A | 10/1999 | Chase, Jr. |
| 5,974,300 A * | 10/1999 | LaPorta et al. ............... 340/7.23 |
| 5,978,689 A | 11/1999 | Tuoriniemi et al. |
| 5,978,837 A | 11/1999 | Foladare et al. |
| 5,983,073 A | 11/1999 | Ditzik |
| 5,987,508 A * | 11/1999 | Agraharam et al. .......... 709/217 |
| 5,991,308 A * | 11/1999 | Fuhrmann et al. ....... 370/395.53 |
| 5,995,597 A | 11/1999 | Woltz et al. |
| 6,000,000 A | 12/1999 | Hawkins et al. |
| 6,002,769 A | 12/1999 | McGough |
| 6,006,274 A | 12/1999 | Hawkins et al. |
| 6,009,173 A | 12/1999 | Sumner |
| 6,014,429 A | 1/2000 | Laporta et al. |
| 6,018,659 A * | 1/2000 | Ayyagari et al. ............... 455/431 |
| 6,018,762 A * | 1/2000 | Brunson et al. ............... 709/206 |
| 6,021,119 A * | 2/2000 | Derks et al. .................... 370/261 |
| 6,023,000 A | 2/2000 | Fritz-Langhals et al. |
| 6,023,700 A | 2/2000 | Owens et al. |
| 6,023,708 A | 2/2000 | Mendez et al. |
| 6,034,621 A | 3/2000 | Kaufman |
| 6,035,104 A | 3/2000 | Zahariev |
| 6,038,439 A * | 3/2000 | Rune ............................... 455/406 |
| 6,044,205 A | 3/2000 | Reed et al. |
| 6,052,442 A | 4/2000 | Cooper et al. |
| 6,052,563 A | 4/2000 | Macko |
| 6,052,735 A | 4/2000 | Ulrich et al. |
| 6,058,431 A | 5/2000 | Srisuresh et al. |
| 6,067,561 A | 5/2000 | Dillon |
| 6,072,862 A | 6/2000 | Srinivasan |
| 6,073,137 A | 6/2000 | Brown et al. |
| 6,073,165 A | 6/2000 | Narasimhan et al. |
| 6,073,178 A | 6/2000 | Wong et al. |
| 6,078,826 A | 6/2000 | Croft et al. |
| 6,081,900 A | 6/2000 | Subramaniam et al. |
| 6,084,969 A | 7/2000 | Wright et al. |
| 6,085,192 A | 7/2000 | Mendez et al. |
| 6,085,231 A | 7/2000 | Agraharam et al. |
| 6,085,232 A | 7/2000 | Kikinis |
| 6,091,951 A | 7/2000 | Sturniolo et al. |
| 6,092,114 A | 7/2000 | Shaffer et al. |
| 6,092,191 A | 7/2000 | Shimbo et al. |
| 6,097,733 A * | 8/2000 | Basu et al. ..................... 370/468 |
| 6,101,531 A | 8/2000 | Eggleston et al. |
| 6,107,876 A | 8/2000 | O'Brien |
| 6,112,244 A | 8/2000 | Moore et al. |
| 6,115,394 A | 9/2000 | Balachandran et al. |
| 6,115,472 A * | 9/2000 | Shimizu et al. ............... 380/262 |
| 6,115,736 A | 9/2000 | Devarakonda et al. |
| 6,119,167 A | 9/2000 | Boyle et al. |
| 6,125,281 A | 9/2000 | Wells et al. |
| 6,125,369 A | 9/2000 | Wu et al. |
| 6,128,739 A | 10/2000 | Fleming, III |
| 6,130,892 A | 10/2000 | Short et al. |
| 6,131,096 A | 10/2000 | Ng et al. |
| 6,131,116 A | 10/2000 | Riggins et al. |
| 6,134,432 A | 10/2000 | Holmes et al. |
| 6,138,146 A | 10/2000 | Moon et al. |
| 6,141,690 A | 10/2000 | Weiman |
| 6,144,671 A | 11/2000 | Perinpanathan et al. |
| 6,144,997 A | 11/2000 | Lamming et al. |
| 6,151,606 A | 11/2000 | Mendez |
| 6,151,674 A | 11/2000 | Takatani |
| 6,154,839 A | 11/2000 | Arrow et al. |
| 6,157,318 A | 12/2000 | Minata |
| 6,157,630 A | 12/2000 | Adler et al. |
| 6,157,950 A | 12/2000 | Krishnan |
| 6,160,804 A * | 12/2000 | Ahmed et al. ................. 370/349 |
| 6,161,139 A | 12/2000 | Win et al. |
| 6,163,274 A | 12/2000 | Lindgren |
| 6,167,379 A | 12/2000 | Dean et al. |
| 6,170,057 B1 | 1/2001 | Inoue et al. |
| 6,178,331 B1 | 1/2001 | Holmes et al. |
| 6,185,603 B1 | 2/2001 | Henderson et al. |
| 6,192,518 B1 * | 2/2001 | Neal .............................. 717/175 |
| 6,195,705 B1 | 2/2001 | Leung |
| 6,202,085 B1 | 3/2001 | Benson et al. |
| 6,203,192 B1 | 3/2001 | Fortman |
| 6,205,448 B1 | 3/2001 | Kruglikov et al. |
| 6,208,996 B1 | 3/2001 | Ben-Shachar et al. |
| 6,219,346 B1 * | 4/2001 | Maxemchuk ................. 370/338 |
| 6,219,694 B1 | 4/2001 | Lazaridis et al. |
| 6,219,715 B1 | 4/2001 | Ohno et al. |
| 6,233,341 B1 | 5/2001 | Riggins |
| 6,236,656 B1 * | 5/2001 | Westerberg et al. ........ 370/395.4 |
| 6,240,088 B1 | 5/2001 | Gayton et al. |
| 6,240,464 B1 | 5/2001 | Fijolek et al. |
| 6,249,820 B1 | 6/2001 | Dobbins et al. |
| 6,256,300 B1 | 7/2001 | Ahmed et al. |
| 6,256,666 B1 | 7/2001 | Singhal |
| 6,260,148 B1 * | 7/2001 | Aggarwal et al. ............... 726/14 |
| 6,272,545 B1 | 8/2001 | Flanagin et al. |
| 6,275,848 B1 | 8/2001 | Arnold |
| 6,275,850 B1 | 8/2001 | Beyda et al. |
| 6,282,575 B1 | 8/2001 | Lin et al. |
| 6,289,212 B1 | 9/2001 | Stein et al. |
| 6,292,657 B1 | 9/2001 | Laursen et al. |
| 6,292,668 B1 | 9/2001 | Alanara et al. |
| 6,311,282 B1 | 10/2001 | Nelson et al. |
| 6,314,108 B1 | 11/2001 | Ramasubramani et al. |
| 6,314,519 B1 | 11/2001 | Davis et al. |
| 6,317,592 B1 * | 11/2001 | Campana et al. ........... 455/412.1 |
| 6,324,544 B1 | 11/2001 | Alam et al. |
| 6,324,587 B1 | 11/2001 | Trenbeath et al. |
| 6,330,244 B1 | 12/2001 | Swartz et al. |
| 6,333,973 B1 | 12/2001 | Smith et al. |
| 6,356,956 B1 | 3/2002 | Deo et al. |
| 6,359,570 B1 | 3/2002 | Adcox et al. |
| 6,360,272 B1 | 3/2002 | Lincke et al. |
| 6,370,566 B2 | 4/2002 | Discolo et al. |
| 6,381,650 B1 * | 4/2002 | Peacock ....................... 709/245 |
| 6,389,455 B1 | 5/2002 | Fuisz |
| 6,389,457 B2 | 5/2002 | Lazaridis et al. |
| 6,400,958 B1 | 6/2002 | Isomursu et al. |
| 6,401,113 B2 | 6/2002 | Lazaridis et al. |
| 6,418,129 B1 * | 7/2002 | Fingerhut ...................... 370/328 |
| 6,438,585 B2 | 8/2002 | Mousseau et al. |
| 6,449,287 B1 | 9/2002 | Leuca et al. |
| 6,463,463 B1 | 10/2002 | Godfrey et al. |
| 6,463,464 B1 | 10/2002 | Lazaridis et al. |
| 6,469,998 B1 * | 10/2002 | Burgaleta Salinas et al. 370/338 |
| 6,470,358 B1 | 10/2002 | Beyda et al. |
| 6,487,560 B1 | 11/2002 | LaRue et al. |
| 6,493,749 B2 | 12/2002 | Paxhia et al. |
| 6,505,214 B1 | 1/2003 | Sherman et al. |
| 6,549,776 B1 * | 4/2003 | Joong ............................ 455/433 |
| 6,571,289 B1 | 5/2003 | Montenegro |
| 6,580,787 B1 | 6/2003 | Akhteruzzaman et al. |
| 6,584,095 B1 * | 6/2003 | Jacobi et al. .................. 370/352 |
| 6,594,484 B1 | 7/2003 | Hitchings, Jr. |
| 6,603,758 B1 * | 8/2003 | Schmuelling et al. ......... 370/352 |
| 6,611,358 B1 | 8/2003 | Narayanaswamy |
| 6,633,761 B1 | 10/2003 | Singhal et al. |
| 6,658,235 B1 * | 12/2003 | Tolmunen et al. .......... 455/67.13 |
| 6,683,871 B1 * | 1/2004 | Lee et al. ...................... 370/356 |
| 6,684,248 B1 | 1/2004 | Janacek et al. |

| | | | |
|---|---|---|---|
| 6,701,378 B1 | 3/2004 | Gilhuly et al. | |
| 6,704,295 B1* | 3/2004 | Tari et al. | 370/270 |
| 6,714,987 B1 | 3/2004 | Amin et al. | |
| 6,760,775 B1 | 7/2004 | Anerousis et al. | |
| 6,765,920 B1* | 7/2004 | Tari et al. | 370/401 |
| 6,768,743 B1 | 7/2004 | Borella et al. | |
| 6,785,724 B1* | 8/2004 | Drainville et al. | 709/227 |
| 6,822,955 B1* | 11/2004 | Brothers et al. | 370/389 |
| 6,826,173 B1* | 11/2004 | Kung et al. | 370/352 |
| 6,842,462 B1* | 1/2005 | Ramjee et al. | 370/466 |
| 6,845,096 B1* | 1/2005 | Hori et al. | 370/352 |
| 7,260,638 B2* | 8/2007 | Crosbie | 709/229 |
| 7,324,492 B2* | 1/2008 | Leung et al. | 370/338 |
| 2001/0001268 A1 | 5/2001 | Menon et al. | |
| 2001/0001552 A1 | 5/2001 | Vong et al. | |
| 2001/0015977 A1 | 8/2001 | Johansson | |
| 2001/0029531 A1 | 10/2001 | Ohta | |
| 2001/0032254 A1* | 10/2001 | Hawkins | 709/219 |
| 2001/0040693 A1 | 11/2001 | Saito et al. | |
| 2001/0042093 A1 | 11/2001 | Shirai et al. | |
| 2001/0042097 A1* | 11/2001 | Lapine | 709/206 |
| 2001/0045885 A1 | 11/2001 | Tett | |
| 2001/0054072 A1 | 12/2001 | Discolo et al. | |
| 2002/0010758 A1 | 1/2002 | Chan | |
| 2002/0013854 A1 | 1/2002 | Eggleston et al. | |
| 2002/0046287 A1* | 4/2002 | La Porta et al. | 709/230 |
| 2002/0059380 A1 | 5/2002 | Biliris et al. | |
| 2002/0098840 A1 | 7/2002 | Hanson et al. | |
| 2002/0137512 A1* | 9/2002 | Jahn | 455/435 |
| 2003/0097361 A1 | 5/2003 | Huang et al. | |
| 2004/0015607 A1* | 1/2004 | Bender et al. | 709/238 |
| 2005/0159142 A1* | 7/2005 | Giniger et al. | 455/414.3 |
| 2008/0045267 A1 | 2/2008 | Hind et al. | |
| 2008/0261632 A1 | 10/2008 | Hind et al. | |

FOREIGN PATENT DOCUMENTS

| | | |
|---|---|---|
| DE | 19961345 | 6/2001 |
| EP | 0001552 | 5/1979 |
| EP | 0617373 | 9/1994 |
| EP | 0736989 | 10/1996 |
| EP | 0772327 | 5/1997 |
| EP | 0777394 | 6/1997 |
| EP | 0788287 | 8/1997 |
| EP | 0793387 | 9/1997 |
| EP | 851 703 | 1/1998 |
| EP | 0825788 | 2/1998 |
| EP | 0838774 | 4/1998 |
| EP | 0838934 | 4/1998 |
| EP | 917317 | 5/1999 |
| EP | 0918417 | 5/1999 |
| EP | 0930766 | 7/1999 |
| EP | 0986225 | 3/2000 |
| EP | 1 011 286 | 6/2000 |
| EP | 1 022 917 | 7/2000 |
| EP | 1 096 725 A2 | 5/2001 |
| EP | 1319294 | 10/2009 |
| EP | 2146483 | 1/2010 |
| JP | 9305155 | 1/1997 |
| JP | 9214556 | 8/1997 |
| JP | 11289346 | 10/1999 |
| WO | 9003613 | 4/1990 |
| WO | 92/11699 | 7/1992 |
| WO | 9619064 | 6/1996 |
| WO | WO 9703341 | 1/1997 |
| WO | 9726709 | 7/1997 |
| WO | 9727717 | 7/1997 |
| WO | WO 97/28518 | 8/1997 |
| WO | 9732251 | 9/1997 |
| WO | 9733421 | 9/1997 |
| WO | 9741654 | 11/1997 |
| WO | 9744942 | 11/1997 |
| WO | WO 97/49251 | 12/1997 |
| WO | 9800787 | 1/1998 |
| WO | WO 9807897 | 1/1998 |
| WO | 9821911 | 5/1998 |
| WO | 9823108 | 5/1998 |
| WO | 9826344 | 6/1998 |
| WO | 9848560 | 10/1998 |
| WO | 99/01999 | 1/1999 |
| WO | 9905620 | 2/1999 |
| WO | 9905813 | 2/1999 |
| WO | 9906900 | 2/1999 |
| WO | 9912365 | 3/1999 |
| WO | 9917505 | 4/1999 |
| WO | 9919988 | 4/1999 |
| WO | 9936870 | 7/1999 |
| WO | 9945484 | 9/1999 |
| WO | 9945684 | 9/1999 |
| WO | 9948312 | 9/1999 |
| WO | 9950974 | 10/1999 |
| WO | 99/61966 | 12/1999 |
| WO | 99/66692 | 12/1999 |
| WO | 9963709 | 12/1999 |
| WO | 0011567 | 3/2000 |
| WO | 0011832 | 3/2000 |
| WO | 0020994 | 4/2000 |
| WO | 00/36794 | 6/2000 |
| WO | WO 00/31931 | 6/2000 |
| WO | 0044149 | 7/2000 |
| WO | WO 00/41359 | 7/2000 |
| WO | WO 00/49819 | 8/2000 |
| WO | WO 01/01264 | 1/2001 |
| WO | 0113572 | 2/2001 |
| WO | 0113656 | 2/2001 |
| WO | WO 01/22669 A1 | 3/2001 |
| WO | 0141472 | 6/2001 |
| WO | 0167716 | 9/2001 |
| WO | 0171539 | 9/2001 |
| WO | 02/25890 | 3/2002 |

OTHER PUBLICATIONS

United States District Court, Northern District of California, San Francisco Division: *Good Technology, Inc. v. Research In Motion, Ltd., et al.*, Case No. C02-2348 MJJ, Plaintiff Good Technology, Inc.'s Preliminary Invalidity Contentions Pursuant to Patent L.R. 3-3 and Response Under Patent L.R. 3-4, Jan. 16, 2004, 33 pages.

Perkins, C.: "RFC 2002—IP Mobility Support," IBM, Oct. 1996, 61 pages.

Johnson, D.: "Scalable Support for Transparent Mobile Host Internetworking," Wireless Networks, The Journal of Mobile Communication, Computation and Information, vol. 1, No. 3, Oct. 1995, pp. 311-321.

Dawson, F., et al.: "iCalendar Message-Based Interoperability Protocol (iMIP)," Standards Track, RFC 2447, iMIP, Nov. 1998, 4 pages, XP-002249002.

Nelson, M.: "Wireless Data Services: Here and Now," PDA Developers 2.6, Nov./Dec. 1994, 3 pages.

Article, Comford, "Handhelds Duke It Out for the Internet," Wireless Internet, pp. 35-38 and 41, Aug. 2000.

Perkins, Charles E., et al., "Mobility Support in IPv6," Mobicom 96, pp. 27-37, 1996.

Motorola, "AirMobile™ Wireless Comm Guide for cc:Mail" User Guide Version 1.0, Motorola Wireless Data Group, 1995, pp. 3-48.

Motorola, "AirMobile™ Wireless Comm Server for cc:Mail" User Guide Version 1.1, Motorola Wireless Data Group, 1995, pp. 4-46.

Sun Microsystems, JavaMail API Design Specification, Version 1.0, Dec. 9, 1997, Sun Microsystems, Inc., chapters 1-10 appendices A-E.

Compaq, Aero 2100 Series Color Palm-size PC Reference Guide, Second Edition, Aug. 1999, Compaq Corporation.

Canadian Office Action, Application No. 2,433,812, Canadian IPO, Jul. 14, 2005, 5 pgs.

Canadian Office Action, Application No. 2,433,812, Canadian IPO, Aug. 20, 2008, 5 pgs.

Canadian Office Action, Application No. 2,433,812, Canadian IPO, Jul. 7, 2009, 4 pgs.

Canadian Office Action, Application No. 2,433,812, Canadian IPO, Dec. 1, 2010, 4 pgs.

PCT International Preliminary Examination Report, Application No. PCT/CA00/02208, European Patent Office, Jan. 29, 2002, 18 pgs.

PCT International Preliminary Examination Report, Application No. PCT/US01/26907, European Patent Office, Jan. 20, 2003, 3 pgs.

PCT Search Report Report, Application No. PCT/US01/26907, European Patent Office, Nov. 15, 2002, 7 pgs.

EP Communication, Application No. 1968230.1, European Patent Office, Aug. 25, 2005, 11 pgs.
EP Communication, Application No. 1968230.1, European Patent Office, Jun. 25, 2007, 4 pgs.
EP Extended European Search Report, Application No. 09 172729.7, European Patent Office, Dec. 18, 2009, 7 pgs.
CIPO, Office Action, Application No. 2,422,812, Jan. 25, 2012, 3 pgs.
ISA/EPO, International Search Report, Application No. PCT/EP01/10317, Mar. 15, 2002, 4 pgs.
SIPO, First Office Action, Application No. 01819119.3, Feb. 18, 2005, 23 pgs.
EPO, Communication Under Rule 71(3) EPC, Application No. 091729.7, Oct. 8, 2012, 5 pgs.
Feibus, "A Desktop In Your Palm", Informationweek, Aug. 25, 1997, pp. 65ff.
Behr, "Handheld Solutions", Informationweek, Oct. 27, 1997, pp. 106-113.
Moody's Investors Service, Socket Communications Inc.—History & Debt, Investex Report No. 3240276, Feb. 28, 1198.
Newsletter, E-Mail Merges With Voice Through Infinite Technologies, Voice Technology & Services News, May 26, 1998.
Newsletter, Vodapage: Vodapage demos increasing convergence of pagers and mobile communications at TMA 29, M2 Presswire, Nov. 28, 1996.
Mosher, Microsoft Exchange User's Handbook, Duke Press, 1997, pp. 547-549.
DTS Wireless Website located at D.R.L. http://www.dtswireless.com, Dec. 30, 1997.
"3Com PalmPilot Gets Wireless Link for E-Mail", Spooner, John G., PC Week, Dec. 8, 1997.
"Have Your Pager Call My Pager", Sullivan, Kristina B., PC Week, Dec. 8, 1997.
Briere, Daniel, et al., "One Mailbox, Just Like Old Times," Network World, vol. 14, issue 16, p. 21 (Apr. 21, 1997).
Padwick, et al., Special Edition Using Microsoft Outlook 97, 1997, Que Corporation, pp. 250-251, 353-367.
News Release, "Motorola Rings in 1995 with the Launch of the Marco® Wireless Communicator," Jan. 4, 1995 (4 pgs.).
Timeline, "FLEX™ Technology Timeline," (3 pgs.), Jun. 18, 2001.
General Magic, Inc., Corporate Backgrounder, 2001 (2 pgs.).
Pegasus Email Settings, ABSnet Internet Services, Inc. (4 pgs.), Jun. 27, 2001.
Motorola, Inc., emailVClient, 2001 (4 pages).
News Release, "Motorola Announces Pagewriter 250, The World's Smallest Pager with Full Keyboard", Feb. 27, 1997 (2 pgs.).
Dewey, Barney, "Communications Strategies for Newton 2.0," Newton Technology Journal, p. 10, Jun. 1996.
Press Release, "Motorola Announces New Solutions to Provide Consumers with Wireless Access to Personal and Enterprise E-mail Accounts," Mar. 21, 2001 (4 pgs.).
"Motorola's 'Marco' Wireless Communicator," http://www.msu.edu/-luckie/gallery/marco.htm, Jun. 14, 2001 (3 pgs.).
News Release, "CE Software Announces MobileVision," Editorial Contacts, CE Software, Inc., 1995 (3 pgs.).
News Release, "CE Software Ships MobileVision," Jun. 20, 1995 (3 pgs.).
Newton Reference, Communications, 1996-1997(4 pgs.).
PC Pro Issue 31: Realworld Computing, PDA Column, Jul. 30, 1997 (7 pgs.).
Enterprise Solutions for Email Overload, Founder Publications, http://www.amikanow.com/corporte/publications.htm, Aug. 6, 2001 (9 pgs.).
"Motorola's 'Marco' Wireless Communicator," http://www.msu.edu/-luckie/gallery/marco.htm, Aug. 6, 2001 (2 pgs.).
Press Release, "Apple Agrees to License Newton Technology to Schlumberger, Digital Ocean," Nov. 3, 1995 (3 pgs.).
Frezza, Bill, "PDA, PDA, Wherefore Art Thou, PDA?", Freewire, Aug. 6, 2001 (6 pgs.).
Black, Lauren, et al., "Personal Digital Assistants," Macworld Reviews, Aug. 6, 2001 (5 pgs.).
Reference, "MobileVision Direct Wireless Connection to Your LAN-Based Electronic Mailbox," CE Software, Inc., pp. 1, 3, 5, 7, 9, 11, 13, 15, 17, 19, 21, 1995.
User Manual, "MobileVision Direct Wireless Connection to Your LAN-Based Electronic Mailbox," CE Software, Inc. 1995.
Johnson, David B., "Ubiquitous Mobile Host Internetworking," Fourth Workshop on Workstation Operating Systems, pp. 85-90, Oct. 14-15, 1993.
Johnson, David B., "Mobile Host Internetworking Using IP Loose Source Routing," School of Computer Science, Carnegie Mellon University, pp. 1-14 Feb. 1993.
Schoettle, Bob, "IP-Address Management on LANs," Byte, pp. 199-200, Feb. 1996.
Cheshire, Stuart, et al., "Internet Mobility 4 X 4," Computer Science Department, Stanford University, pp. 1-12, Aug. 1996.
Yeom, Hoen Y., et al., "IP Multiplexing by Transparent Port-Address Translator," Proceeding of the Tenth USENIX System Administration Conference, pp. 113-122, Sep. 29-Oct. 4, 1996.
Johnson, David B., "Scalable and Robust Internetwork Routing for Mobile Hosts," IEEE Computer Society, pp. 2-11, 1994.
Egevang, K. et al., "The IP Network Address Translator," Network Working Group, pp. 1-10, May 1994.
Manual, "Server and BBS Software for the Packet Radio" by Jean Paul Roubelat, pp. 1-173, Feb. 6, 1993.
Book, "Internetwork Mobility The CDPD Approach," by Mark S. Taylor, William Waung, and Mohsen Banan, Jun. 11, 1996.
"BlackBerry Technical White Paper," Research In Motion Ltd., Version 1.0, 1998-1999.
Newsletter, "Battery Friendly Bulletin," vol. 1, Issue 3, pp. 1-7 and unnumbered page, 1999.
Article, Comerford, "Handhelds Duke It Out for the Internet," Wireless Internet, pp. 35-38 and 41, Aug. 2000.
Press Detail, "Extended Systems and Motorola Bring Short-Range Wireless to the Paging E-volution," Jan. 13, 2000 (3 pgs.).
Press Detail, "3Com Corporation Licenses Bluetooth Technology from Extended Systems," Feb. 22, 2000 (2 pgs.).
Web site Article, Hawaleshka, "The Web in Your Pocket," Maclean's, May 15, 2000 (3 pgs.).
Claxton, "Messaging API's for Voice Networks," Telecommunications, pp. 116-120, 1998.
Gifford, David K., et al., "The Application of Digital Broadcast Communication to Large Scale Information Systems," IEEE Journal on Selected Areas in Communications, vol. SAC-3, No. 3, pp. 457-467 (May 1985).
Gifford, David K., et al., "An Architecture for Large Scale Information Systems," ACM, pp. 161-170 (1985).
Arnum, Eric, "The Universal Mailbox Arrives . . . Sort Of," Business Communications Review, pp. 49-52 (May 1996).
"Wireless E-Mail Services Gain Windows Clients," Kramer, Matt, PC Week, Apr. 17, 1995.
Perkins, C. et al., "IMHP: A Mobile Host Protocol For The Internet," Computer Networks And ISDN Systems 27 (1994), pp. 479-491.
Inouye, Jon et al., "System Support for Mobile Multimedia Applications," Proceedings of the IEEE $7^{th}$ International Workshop on Network And Operating System Support For Digital Audio And Video, May 19-21, 1997, pp. 135-146.
Xu, Kevin Houzhi, "Reliable Stream Transmission Protocols In Mobile Computing Environments," Bell Labs Technical Journal, Summer 1997, pp. 152-163.
Lavana, Hemang et al.., "Internet-Based Workflows: A Paradigm For Dynamically Reconfigurable Desktop Environments," Conference on Supporting Group Work, Proceedings of the International ACM SIGGROUP Conference on Supporting Group Work: The Integration Challenge, Nov. 16-19, 1997, pp. 204-213.
Perkins, Charles E. et al., "Mobility Support In IPv6," International Conference on Mobile Computing and Networking, Proceedings of the Second Annual International Conference on Mobile Computing and Networking, Nov. 11-12, 1996, pp. 27-37.
Goldszmidt, German et al., "*ShockAbsorber*: A TCP Connection Router," Globecom 97, IEEE Global Telecommunications Conference, Nov. 3-8, 1997, pp. 1919-1923.
SAM Reference Manual, System for Automated Messages (Sep. 1989).

IBM Portable Terminal User's Guide, Third Edition (Jun. 1985).
Binder, Richard et al, The Alohanet Menehune, University of Hawaii, Version II (Sep. 1974).
Computer Structures—Principles and Examples, McGraw Hill (1982).
Krebs, Jay, Portable Computer and Host Talk Over Radio-Frequency Link, Electronic, pp. 142-145 (Aug. 25, 1983).
Gadol, Steve, et al. "Nomadic Tenets—A User's Perspective," Sun Microsystems Laboratories, Inc., pp. 1-16 (Jun. 1994).
Declaration of David A. Keeney regarding SAM System, pp. 1-33 (Sep. 3, 2002).
"SAM™ integrates E-mail, Alpha Paging, Fax, and more!", SAM System for Automated Messages (10 pgs.), Oct. 3, 1989.
SAMpage Manual, version 2.0, TeckNow! (Feb. 1990).
Reiter, Alan A., "Focus on Technology," Telocator (Jan. 1990) (4 pgs.).
Kuehn, Carl, "More than EMail," Southwest Computer & Business Equipment Review, vol. VII, No. 2, (Feb. 1990) (1 pg.).
SAM System for Automated Messages User's Manual (1988) (17 pgs.).
Motorola Operating Instructions for Your "PMR 2000" Series Display Radio Pagers Personal Message Center (2000) (7 pgs.).
Motorola PMR 2000 Personal Message Receiver POCSAG (CCIR Radio Paging Code #1) (1986) (6 pgs.).
EPO, Communication Under Rule 71(3) EPC, Application No. 01968230.1, Feb. 6, 2009, 7 pgs.
EPO, Decision to Grant European Patent Pursuant to Article 97(1) EPC, Application No. 01968230.1, Sep. 17, 2009, 2 pgs.
EPO, Certificate of Grant EP Pat. 1319294, Application No. 01968230.1, Oct. 14, 2009, 2 pgs.
USPTO, Office Action, U.S. Appl. No. 11/925,861, Apr. 23, 2010, 31 pgs.
USPTO, Office Action, U.S. Appl. No. 11/925,866, May 18, 2010, 21 pgs.

* cited by examiner

SYSTEM AND METHOD FOR PUSHING INFORMATION FROM A HOST SYSTEM TO A MOBILE DATA COMMUNICATION DEVICE IN A WIRELESS DATA NETWORK

CROSS-REFERENCE TO RELATED APPLICATIONS

This application claims priority from U.S. Provisional Application Ser. Nos. 60/268,824, filed on Feb. 14, 2001, Ser. No. 60/237,616, filed on Oct. 3, 2000, and Ser. No. 60/233,501, filed on Sep. 19, 2000. This application also claims priority from, and is a continuation-in-part of, U.S. patent application Ser. No. 09/528,495, filed on Mar. 17, 2000 which is a continuation of Ser. No. 09/087,623, filed on May 29, 1998, now U.S. Pat. No. 6,219,694. The complete disclosure of each of these provisional and utility applications, and the issued patent, including drawings and claims, is hereby incorporated into this application by reference.

BACKGROUND

1. Field of the Invention

The present invention is directed to the field of data communications in a wireless network. More specifically, the invention relates to a system and method for communicating information to a mobile communication device ("mobile device") within a wireless data network (such as an IP based wireless data network) and also for replicating information between a host system (or a host system with an associated messaging server) and the mobile device via the wireless data network.

2. Description of the Related Art

Wireless data networks are known in this field. Early wireless data networks include the Mobitex network and the Datatac network. These early networks provided limited data capacity and also required to have fixed addresses for each mobile device. Such a fixed address is also known as a "static" network address. Recently, however, new types of wireless data networks have emerged having much greater data bandwidth. These new data networks, such as the GPRS network, may utilize the Internet Protocol (IP) for routing data to a mobile device. The inherent addressing limitations of the IP protocol (and other similar packet protocols) typically limit the use of have static addressing in these types of data networks, thus leading to a dynamic addressing scheme. In this type of addressing scheme, a pool of available network addresses is dynamically assigned to a much greater pool of user devices depending on which devices are accessing the network at a given instant.

As described in more detail in the co-pending, and co-owned application S/N, a wireless data network can be coupled to one or more redirector applications for enabling real-time mirroring (or redirection) of user data items from a user's office computer (or corporate server) to the user's mobile device. In such a redirector application, user data items, such as e-mail messages, calendar events, etc., are received at the user's office computer, which then redirects (or mirrors) the data items to the user's mobile device via the wireless data network. It would be advantageous to extend this redirection system to operate with newer wireless data networks such as the General Packet Radio Service ("GPRS") network, or other networks that may utilize a packet protocol, such as IP, in which the wireless data network dynamically assigns network addresses on an as-needed basis.

SUMMARY

A system and method for redirecting data to one or more mobile data communication devices via a wireless packet data network is provided in which the network dynamically assigns network addresses to the mobile data communication devices on an as-needed basis. A redirector program preferably operating at a host system continuously redirects data to the wireless packet data network, as the data is received (or altered) at the host system. Two methods are provided for communicating the redirected data from the wireless network to the mobile device. In a first method, the mobile device is configured to periodically contact a store-and-forward server (or gateway) operating in conjunction with the wireless network, which, when contacted, transmits the data to the mobile device. In a second method, the wireless network transmits a connection request command to the mobile device via a parallel voice network, or via a control channel on the data network, or via some other type of low-bandwidth data channel. The mobile device then contacts the wireless data network and requests a network address so that the store-and-forward server can send the data to the mobile device. In this second embodiment the presence of a 'push bearer' channel is preferred. A push bearer network is defined as a network that can provide an address for the wireless device that is statically defined and always reachable. The push bearer network can have low capacity and very limited bandwidth, as is the case with the Short Message Service (SMS) messaging, used on many wireless networks.

The redirector program enables a user to redirect (or mirror) certain user-selected data items (or parts of data items) from the host system to the user's mobile data communication device upon detecting that one or more user-defined triggering events has occurred. Also operating at the host system are various sub-systems that can be configured to create triggering events, such as a screen saver sub-system or a keyboard sub-system, as well as sub-systems for repackaging the user's data items for transparent delivery to the mobile device, such as a TCP/IP sub-system or one or more E-Mail sub-systems. Other sub-systems for creating triggering events and repackaging the user's data items could also be present at the host system.

Using the redirector program, the user can select certain data items for redirection, such as E-mail messages, calendar events, meeting notifications, address entries, journal entries, personal reminders, etc. Having selected the data items for redirection, the user can then configure one or more event triggers, which are sensed by the redirector program to initiate redirection of the user's data items. These user-defined triggers (or event triggers) may include external events, internal events and networked events. Examples of external events include: receiving a message from the user's mobile data communication device to begin redirection; receiving a similar message from some external computer; sensing that the user is no longer in the vicinity of the host system; or any other event that is external to the host system. Internal events could be a calendar alarm, screen saver activation, keyboard timeout, programmable timer, or any other user-defined event that is internal to the host system. Networked events are user-defined messages that are transmitted to the host system from another computer coupled to the host system via a network to initiate redirection.

In addition to the functionality noted above, the redirector program provides a set of software-implemented control functions for determining the type of mobile data communication device and its address (if a static address is used), for programming a preferred list of message types that are to be redirected, and for determining whether the mobile device can receive and process certain types of message attachments, such as word processor or voice attachments.

The determination of whether a particular mobile device can receive and process attachments is initially configured by the user of that mobile device at the host system. This configuration can be altered on a global or per message basis by transmitting a command message from the mobile device to the host system. If the redirector is configured so that the mobile device cannot receive and process word processor or voice attachments, then the redirector program routes these attachments to an external machine that is compatible with the particular attachment, such as an attached printer or networked fax machine or telephone. Other types of attachments could be redirected to other types of external machines in a similar fashion, depending upon the capabilities of the mobile device. For example, if a user is traveling and receives a message with an attachment that the user's mobile device can process or display, the user may, from a mobile communications device, send a command message to the host system indicating that that attachment should be sent to a fax machine at a hotel where the user will be spending the evening. This enables the user to receive important E-mail attachments as long as the host system is provided with sufficient information about the destination where the attachment is to be forwarded.

Once an event has triggered redirection of the user data items, the host system repackages these items in a manner that is transparent to the mobile data communication device, so that the data at the mobile device appears similar to the same data at the user's host system. The preferred repackaging method includes wrapping the user data items in an E-mail envelope that corresponds to the address of the mobile data communication device, although, alternatively, other repackaging methods could be used with the present invention, such as special-purpose TCP/IP wrapping techniques, or other methods of wrapping the user selected data items. The repackaging method preferably results in a shared E-mail address for the user's host system and the user's mobile device. To a recipient of an E-mail generated at either the host or the mobile device, it appears as though the E-mail was generated at the host system. The repackaging method also provides encryption/decryption and compression/decompression.

In an alternative system and method, the redirector program executes at a network server, and the server is programmed to detect numerous redirection event triggers over a local area network ("LAN") from multiple user desktop systems coupled to the server via the LAN. The server can receive internal event triggers from each of the user desktops via the LAN, and can also receive external event triggers, such as messages from the users' mobile data communication devices. In response to receiving one of these triggers, the server redirects the user's data items to the proper mobile data communication device. The user data items and addressing information for a particular mobile device can be stored at the server or at the user's desktop system. Using this alternative configuration, one redirector program can serve a plurality of users. This alternative configuration could also include an Internet or Intranet-based redirector program that could be accessible through a secure webpage or other user interface.

In another alternative configuration of the present invention, a redirector program operates at both the host system and at the user's mobile data communication device. In this configuration, the user's mobile device operates similarly to the host system, described below, and is configured in a similar fashion to redirect certain user-selected data items from the mobile device to the user's host system (or some other computer) upon detecting an event trigger at the mobile device. This configuration provides two-way redirection of information from the host to the mobile device and from the mobile device to the host.

The present invention can be used with many types of mobile data communication devices, including two-way pagers, cellular telephones having data messaging capabilities, PDAs, laptops, palmtops, or any other type of wireless communicator. These wireless communicators may be dual-mode devices that operate on both voice and data networks, such as a communicator capable of sending and receiving voice signals over a voice network like GSM, and also capable of sending and receiving data signals over a data network like GPRS. Or, the wireless communicator may be a single-mode device that operates on just a data network (like GPRS), or it may be a multimode device capable of operating on some other combination of voice and data networks.

DETAILED DESCRIPTION OF THE DRAWINGS

Figure 1:
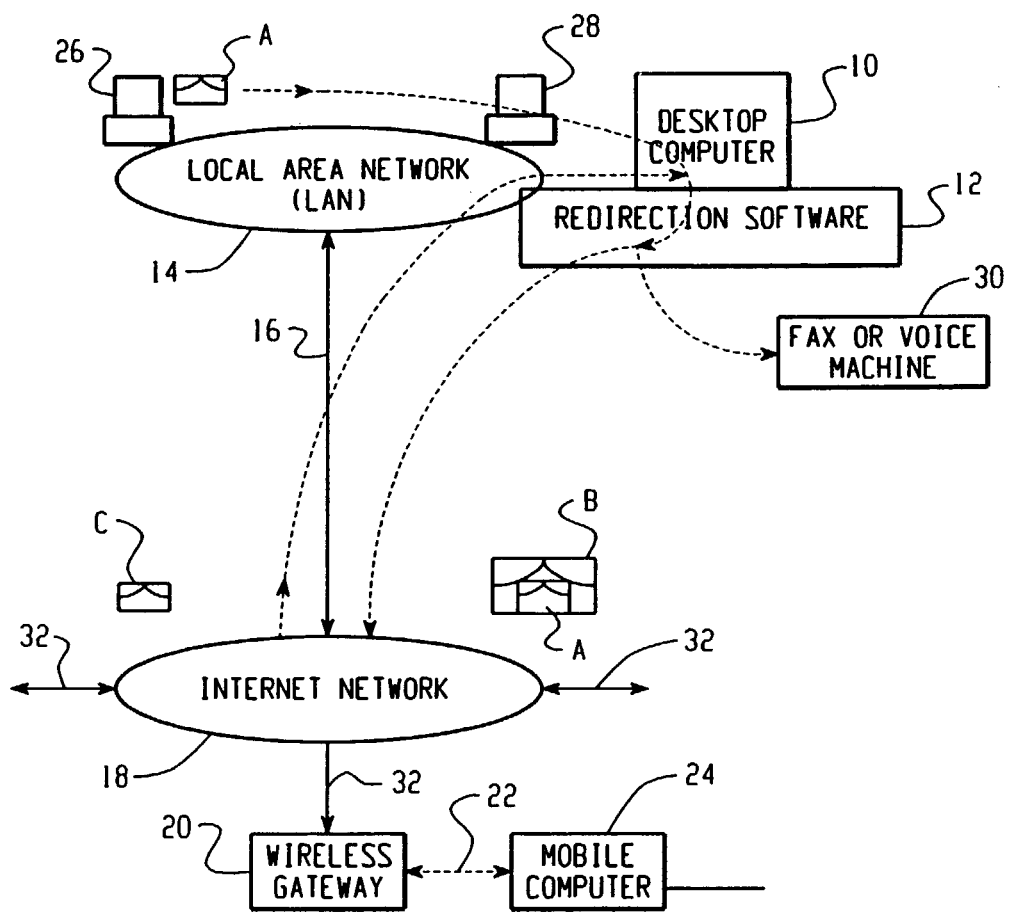
FIG. 1 is a system diagram showing the redirection of user data items from a user's desktop PC (host system) to the user's mobile data communication device, where the redirector software is operating at the user's desktop PC.

Referring now to the drawings, FIG. 1 is an example system diagram showing the redirection of user data items (such as message A or C) from a user's office PC (host system) 10 to the user's mobile data communication device 24, where the redirector software 12 is operating at the user's PC. Message A in FIG. 1 represents an internal message sent from desktop 26 to the user's host system 10 via LAN 14. Message C in FIG. 1 represents an external message from a sender that is not directly connected to LAN 14, such as the user's mobile data communication device 24, some other user's mobile device (not shown), or any user connected to the Internet 18. Message C also represents a command message from the user's mobile data communication device 24 to the host system 10. As described in more detail in FIG. 3, the term "host system" 10 preferably includes, along with the typical hardware and software associated with a workstation or desktop computer, the redirector program 12, a TCP/IP subsystem 42, a primary message store 40, an E-mail subsystem 44, a screen saver subsystem 48, and a keyboard subsystem 46. The E-mail subsystem may be composed of one or more message servers (not necessarily the same type of message server) linked via communication means for the purposes of sending and receiving E-mail between workstations in the LAN, the Internet, and one or more Intranets or other proprietary private networks.

In FIG. 1, the host system 10 is the user's desktop system, typically located in the user's office. The host system 10 is connected to a LAN 14, which also connects to other computers 26, 28 that may be in the user's office or elsewhere. The LAN 14, in turn, is connected to a wide area network ("WAN") 18, such as the Internet, which is defined by the use of the Transmission Control Protocol/Internet Protocol ("TCP/IP") to exchange information, but which, alternatively, could be any other type of WAN. The connection of the LAN 14 to the WAN 18 is via high bandwidth link 16, typically a T1 or T3 connection. The WAN 18, in turn, is connected to a variety of gateways 20 via connections 32. A gateway forms a connection or bridge between the WAN 18 and some other type of network, such as an RF wireless network, cellular network, satellite network, or other synchronous or asynchronous land-line connection.

In the example of FIG. 1, a wireless gateway 20 is connected to the Internet for communicating via wireless link 22 to a plurality of wireless mobile data communication devices 24. For the purposes of this application description the term store-and-forward gateway 140 will also be used in place of the term wireless gateway 20. In an embodiment, the store and forward gateway may be referenced as a Access Point Name (APN) as defined on a network like GPRS. Also shown in FIG. 1 is external machine 30, which could be a FAX machine, a printer, a system for displaying images (such as video) or a machine capable of processing and playing audio files, such as a voice mail system. The present invention includes the ability to redirect certain message attachments to such an external machine 30 if the redirector-program configuration data reflects that the mobile device 24 cannot receive and process the attachments, or if the user has specified that certain attachments are not to be forwarded to mobile device 24, even if such device can process those attachments. By way of example, consider an E-mail sent to a user that includes three attachments—a word processing document, a video clip and an audio clip. The redirection program could be configured to send the text of the E-mail to the mobile device, to send the word processing document to a networked printer located near the user, to send the video clip to a store accessible through a secure connection through the Internet, and to send the audio clip to the user's voice mail system.

Figure 4:
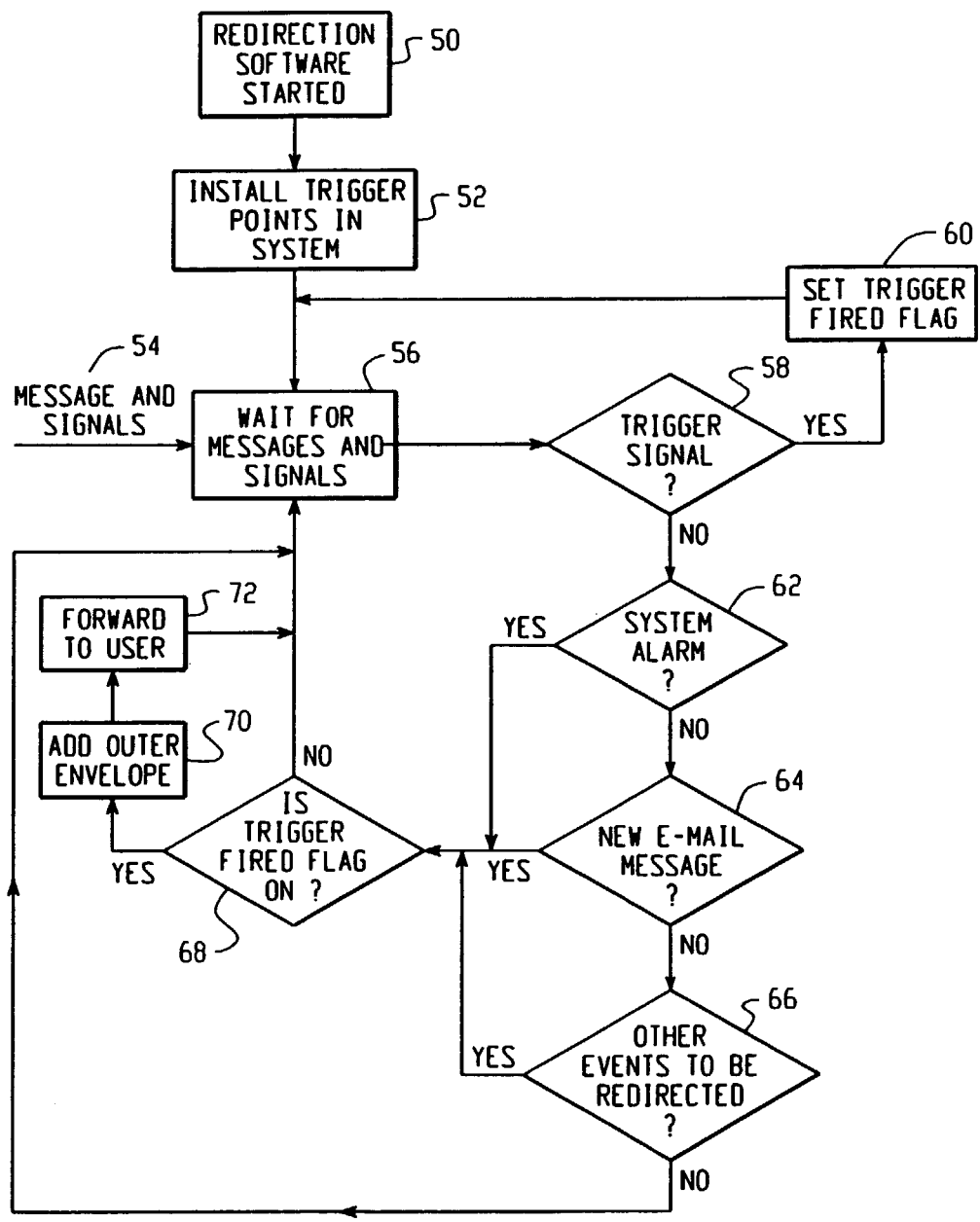
FIG. 4 is a flow chart showing the steps carried out by the redirector software operating at the host system.
Figure 5:
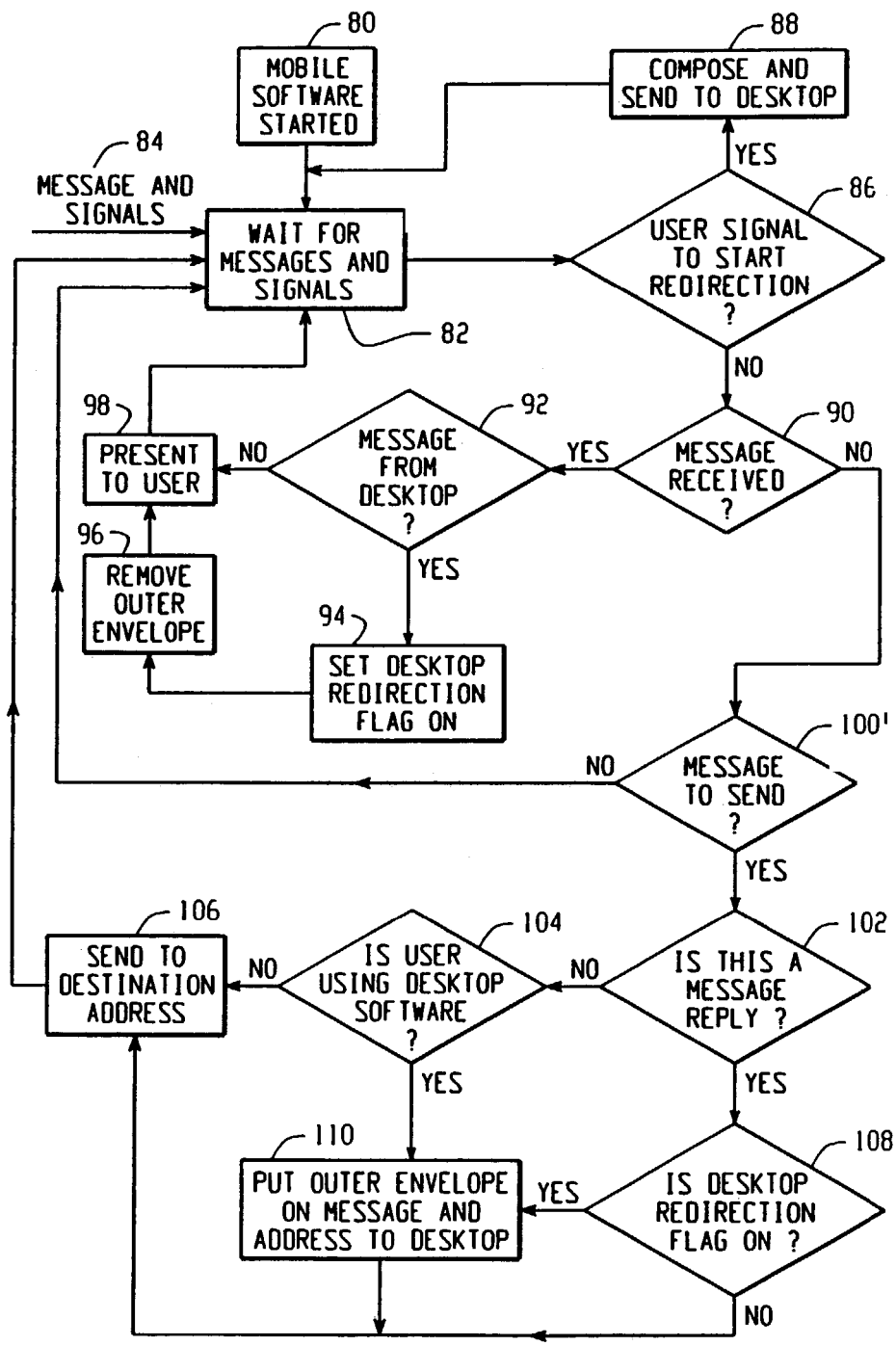
FIG. 5 is a flow chart showing the steps carried out by the mobile data communication device to interface with the redirector software operating at the host system.
Figure 6:
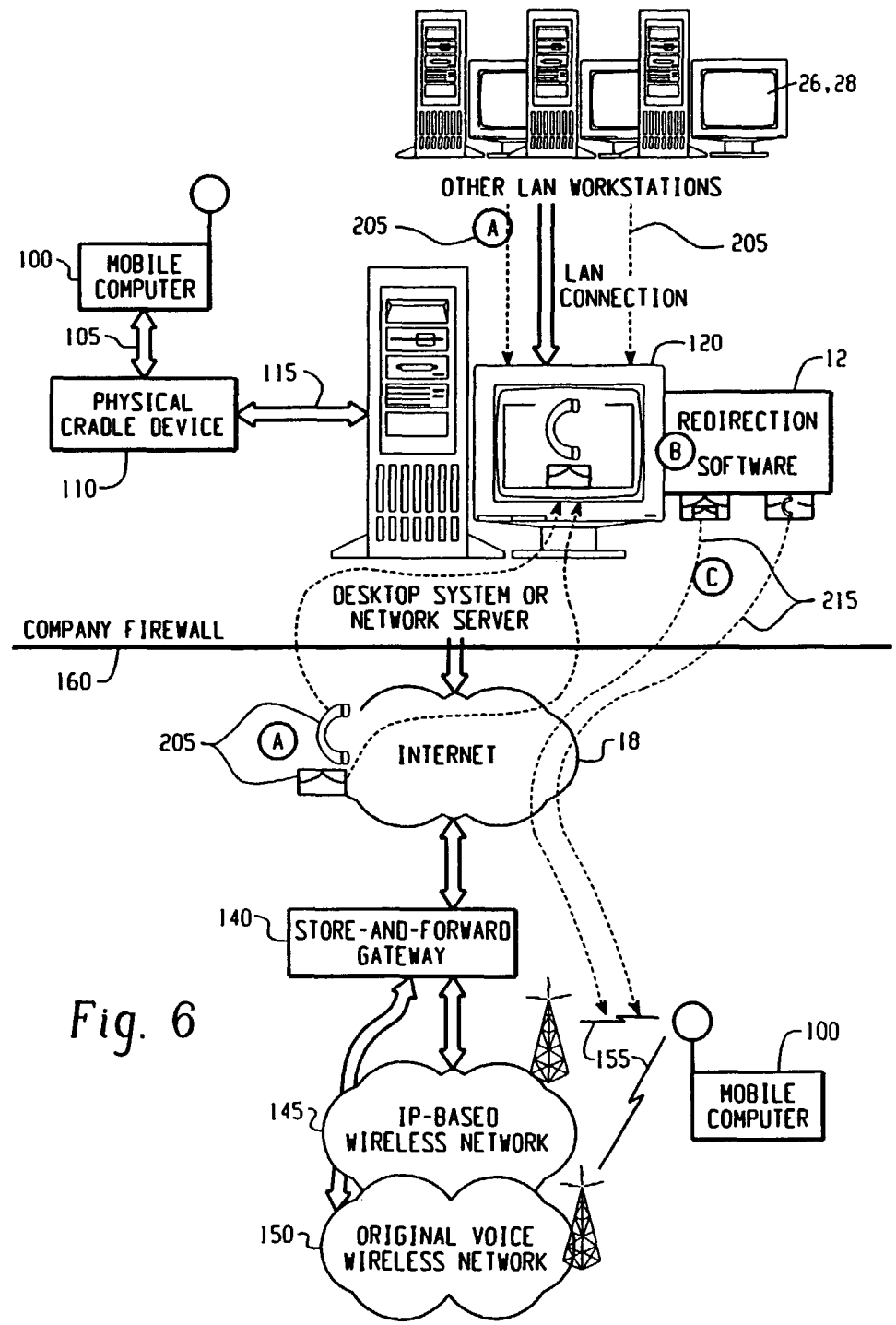
FIG. 6 is a system diagram showing the basic components of an IP based wireless data network, such as the GPRS network, for use with the present invention.
Figure 7:
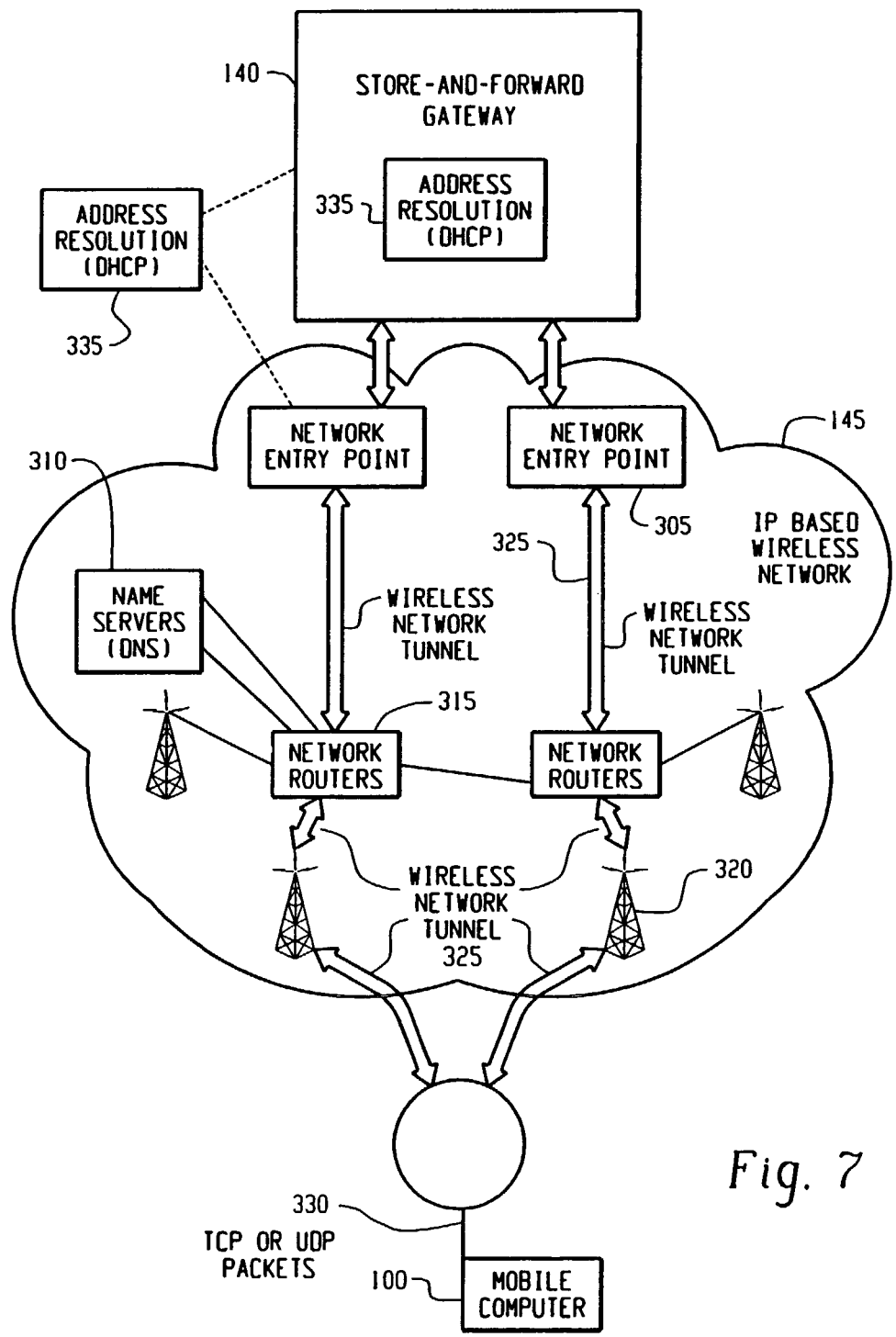
FIG. 7 is a detailed illustration of how addresses are dynamically assigned and how data tunnels are created and used within an IP based wireless network.

The preferred mobile data communication device 24 is a hand-held two-way wireless paging computer, a wirelessly enabled palm-top computer, a mobile telephone with data messaging capabilities, or a wirelessly enabled laptop computer, but could, alternatively be other types of mobile data communication devices capable of sending and receiving messages via a network connection 22. Although it is preferable for the system to operate in a two-way communications mode, certain aspects of the invention could be beneficially used in a "one and one-half" or acknowledgment paging environment, or even with a one-way paging system. The mobile data communication device 24 includes software program instructions that work in conjunction with the redirector program 12 to enable the seamless, transparent redirection of user-selected data items. FIG. 4 describes the basic method steps of the redirector program 12, and FIG. 5 describes the steps of the corresponding program operating at the mobile device 24.

Figure 12:
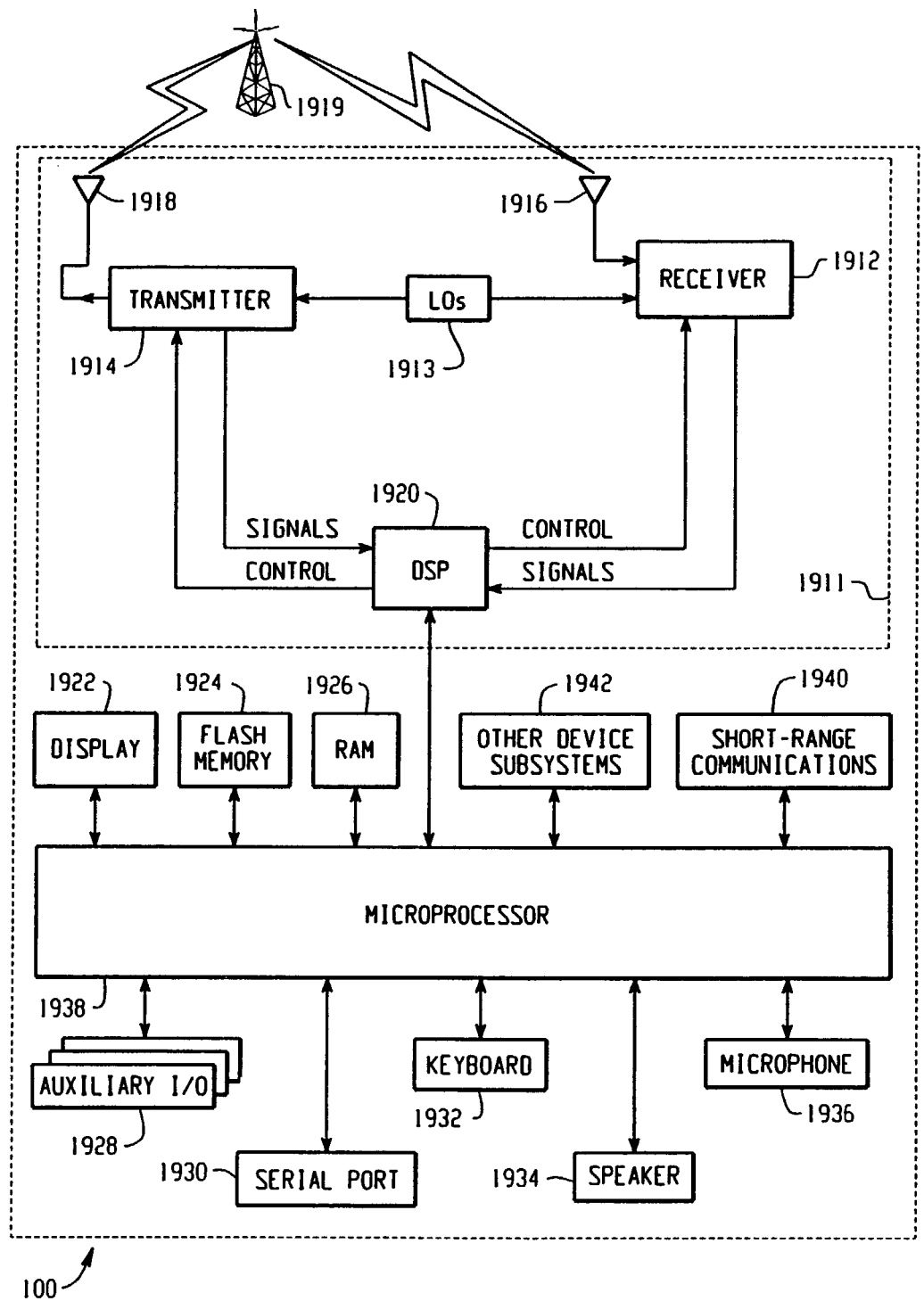
FIG. 12 is an illustrative system diagram of a proposed dual mode device that could be used with the invention.

One example of a dual-mode device is shown in FIG. 12. The mobile communication device 24 shown in FIG. 12 is preferably a two-way communication device having at least voice and data communication capabilities. The device preferably has the ability to communicate with other computer systems on the Internet. Depending on the functionality provided by the device, the device may be referred to as a data messaging device, a two-way pager, a cellular telephone with data messaging capabilities, a wireless Internet appliance or a data communication device (with or without telephony capabilities).

Where the device 24 is enabled for two-way communications, the device will incorporate a communication subsystem 1911, including a receiver 1912, a transmitter 1914, and associated components such as one or more, preferably embedded or internal, antenna elements 1916 and 1918, local oscillators (LOs) 1913, and a processing module such as a digital signal processor (DSP) 1920. As will be apparent to those skilled in the field of communications, the particular design of the communication subsystem 1911 will be dependent upon the communication network in which the device is intended to operate. For example, a device 24 destined for a North American market may include a communication subsystem 1911 designed to operate within the Mobitex™ mobile communication system or the DataTAC™ mobile communication system, whereas a device 24 intended for use in Europe may incorporate a General Packet Radio Service (GPRS) communication subsystem 1911.

Network access requirements will also vary depending upon the type of network 1919. For example, in the Mobitex and DataTAC networks, mobile devices 24 are registered on the network using a unique personal identification number or PIN associated with each device. In GPRS networks, however, network access is associated with a subscriber or user of a device 24. A GPRS device therefore requires a subscriber identity module (not shown), commonly referred to as a SIM card, in order to operate on a GPRS network. Without a SIM card, a GPRS device will not be fully functional. Local or non-network communication functions (if any) may be operable, but the device 24 will be unable to carry out any functions involving communications over the network 1919. When required network registration or activation procedures have been completed, a device 24 may send and receive communication signals over the network 1919. Signals received by the antenna 1916 through a communication network 1919 are input to the receiver 1912, which may perform such common receiver functions as signal amplification, frequency down conversion, filtering, channel selection and the like, and in the example system shown in FIG. 19, analog to digital conversion. Analog to digital conversion of a received signal allows more complex communication functions, such as demodulation and decoding to be performed in the DSP 1920. In a similar manner, signals to be transmitted are processed, including modulation and encoding, for example, by the DSP 1920 and input to the transmitter 1914 for digital to analog conversion, frequency up conversion, filtering, amplification and transmission over the communication network 1919 via the antenna 1918.

The DSP 1920 not only processes communication signals, but also provides for receiver and transmitter control. For example, the gains applied to communication signals in the receiver 1912 and transmitter 1914 may be adaptively controlled through automatic gain control algorithms implemented in the DSP 1920.

The device 24 preferably includes a microprocessor 1938, which controls the overall operation of the device. Communication functions, including at least data and voice communications, are performed through the communication subsystem 1911. The microprocessor 1938 also interacts with other device subsystems, such as the display 1922, flash memory 1924, random access memory (RAM) 1926, auxiliary input/output (I/O) subsystems 1928, serial port 1930, keyboard 1932, speaker 1934, microphone 1936, a short-range communications subsystem 1940 and any other device subsystems generally designated as 1942.

Some of the subsystems shown in FIG. 12 perform communication-related functions, whereas other subsystems may provide "resident" or on-device functions. Notably, some subsystems, such as keyboard 1932 and display 1922, for example, may be used for both communication-related functions, such as entering a text message for transmission over a communication network, and device-resident functions, such as a calculator or task list.

Operating system software used by the microprocessor 1938 is preferably stored in a persistent store, such as flash memory 1924, which may alternately be a read only memory (ROM) or similar storage element. Those skilled in the art will appreciate that the operating system, specific device applications, or parts thereof, may be temporarily loaded into a volatile store, such as RAM 1926. It is contemplated that received communication signals may also be stored to RAM 1926.

The microprocessor 1938, in addition to its operating system functions, preferably enables execution of software applications on the device. A predetermined set of applications that control basic device operations, including at least data and voice communication applications, for example, may be installed on the device 24 during manufacture. A preferred application that may be loaded onto the device may be a personal information manager (PM) application having the ability to organize and manage data items relating to the device user such as, but not limited to, e-mail, calendar events, voice mails, appointments, and task items. Naturally, one or more memory stores would be available on the device to facilitate storage of PIM data items on the device. Such PIM application would preferably have the ability to send and receive data items, via the wireless network. In a preferred embodiment, the PIM data items are seamlessly integrated, synchronized and updated, via the wireless network, with the device user's corresponding data items stored or associated with a host computer system. Further applications may also be loaded onto the device 24 through the network 1919, an auxiliary I/O subsystem 1928, serial port 1930, short-range communications subsystem 1940 or any other suitable subsystem 1942, and installed by a user in the RAM 1926 or preferably a non-volatile store for execution by the microprocessor 1938. Such flexibility in application installation increases the functionality of the device and may provide enhanced on-device functions, communication-related functions, or both. For example, secure communication applications may enable electronic commerce functions and other such financial transactions to be performed using the device 24.

In a data communication mode, a received signal, such as a text message or web page download, will be processed by the communication subsystem 1911 and input to the microprocessor 1938, which will preferably further process the received signal for output to the display 1922, or alternatively to an auxiliary I/O device 1928. A user of device 24 may also compose data items, such as email messages, for example, using the keyboard 1932, which is preferably a complete alphanumeric keyboard or telephone-type keypad, in conjunction with the display 1922 and possibly an auxiliary I/O device 1928. Such composed items may then be transmitted over a communication network through the communication subsystem 1911.

For voice communications, overall operation of the device 24 is substantially similar, except that received signals would preferably be output to a speaker 1934 and signals for transmission would be generated by a microphone 1936. Alternative voice or audio I/O subsystems, such as a voice message recording subsystem, may also be implemented on the device 24. Although voice or audio signal output is preferably accomplished primarily through the speaker 1934, the display 1922 may also be used to provide an indication of the identity of a calling party, the duration of a voice call, or other voice call related information for example.

The serial port 1930 in FIG. 12 would normally be implemented in a personal digital assistant (PDA)-type communication device for which synchronization with a user's desktop computer (not shown) may be desirable, but is an optional device component. Such a port 1930 would enable a user to set preferences through an external device or software application and would extend the capabilities of the device by providing for information or software downloads to the device 24 other than through a wireless communication network. The alternate download path may, for example, be used to load an encryption key onto the device through a direct and thus reliable and trusted connection to thereby enable secure device communication.

A short-range communications subsystem 1940 is a further optional component, which may provide for communication between the device 1924 and different systems or devices, which need not necessarily be similar devices. For example, the subsystem 1940 may include an infrared device and associated circuits and components or a Bluetooth™ communication module to provide for communication with similarly-enabled systems and devices.

In an alternative embodiment of the present invention, the mobile device 24 also includes a redirector program. In this embodiment, user selected data items can be replicated from the host to the mobile device and vice versa. The configuration and operation of the mobile device 24 having a redirector program is similar to that described herein with respect to FIGS. 1-4.

A user of the present invention can configure the redirector program 12 to push certain user-selected data items to the user's mobile device 24 when the redirector 12 detects that a particular user-defined event trigger (or trigger point) has taken place. User-selected data items preferably include E-mail messages, calendar events, meeting notifications, address entries, journal entries, personal alerts, alarms, warnings, stock quotes, news bulletins, corporate data (from an Intranet or from behind the corporate firewall), etc., but could, alternatively, include any other type of message that is transmitted to the host system 10, or that the host system 10 acquires through the use of intelligent agents, such as data that is received after the host system 10 initiates a search of a database or a website or a bulletin board. In some instances, only a portion of the data item is transmitted to the mobile device 24 in order to minimize the amount of data transmitted via the wireless network 22. In these instances, the mobile device 24 can optionally send a command message to the host system to receive more or all of the data item if the user desires to receive it.

Among the user-defined event triggers that can be detected by the redirector program 12 are in the preferred embodiment external events, internal events and networked events. External events preferably include: (1) receiving a command message (such as message C) from the user's mobile data communication device to begin redirection, or to execute some other command at the host, such as a command to enable the preferred list mode, or to add or subtract a particular sender from the preferred list; (2) receiving a similar message from some external computer; and (3) sensing that the user is no longer in the vicinity of the host system; although, alternatively, an external event can be any other detectable occurrence that is external to the host system. Internal events could be a calendar alarm, screen saver activation, keyboard timeout, programmable timer, or any other user-defined event that is internal to the host system. Networked events are user-defined messages that are transmitted to the host system from another computer coupled to the host system via a network to initiate redirection. These are just some of the events that could be used with the present invention to initiate replication of the user-selected data items from the host system 10 to the mobile device 24.

FIG. 1 shows an E-mail message A being communicated over LAN 14 from computer 26 to the user's desktop system 10 (also shown in FIG. 1 is an external message C, which could be an E-mail message from an Internet user, or could be a command message from the user's mobile device 24). Once the message A (or C) reaches the primary message store of the host system 10, it can be detected and acted upon by the redirection software 12. The redirection software 12 can use many methods of detecting new messages. The preferred method of detecting new messages is using a message server like Microsoft's® Messaging API (MAPI), IMAP4 server or Lotus Notes messaging API, in which programs, such as the redirector program 12, register for notifications or 'advise syncs' when changes to a mailbox take place. Other methods of detecting new messages could also be used with the present invention. This tight integration between the redirection program 12 and a messaging server effectively means the two programs are co-operating to provide a wireless extension to an existing messaging product. In another embodiment, the redirection program is an embedded component of the message server.

Assuming that the redirector program 12 is activated, and has been configured by the user (either through the sensing of an internal, network or external event) to replicate certain user data items (including messages of type A or C) to the mobile device 24, when the message A is received at the host system 10, the redirector program 12 detects its presence and prepares the message for redirection to the mobile device 24. In preparing the message for redirection, the redirector program 12 could compress the original message A, could compress the message header, or could encrypt the entire message A to create a secure link to the mobile device 24.

Also exchanged between the mobile device and the redirector 12 is a personal identification number (PIN) of the user's mobile device 24 such that the redirector 12 associates the mailbox of the user with a PIN. The PIN value could be selected by the manfacturer of the mobile device 24 and programmed into the mobile device 24. Alternatively, this PIN could be a network identifier such as MSISDN, or another value associated with the Subscriber Identity Module (SIM) such as the IMSI. This PIN will be processed by the store-and-forward gateway as it maps the PIN of the mobile device 24 to the currently assigned IP address. Other values that could be saved by the redirector program 12 could include: the type of device, and whether the device 24 can accept certain types of attachments, such as word processing or voice attachments. If the user's type of mobile device cannot accept these types of attachments, then the redirector 12 can be programmed to route the attachments to a fax or voice number where the user is located using an attached fax or voice machine 30.

The redirector may also be programmed with a preferred list mode that is configured by the user either at the host system 10, or remotely from the user's mobile data communication device by transmitting a command message C. The preferred list contains a list of senders (other users) whose messages are to be redirected or a list of message characteristics that determine whether a message is to be redirected. If activated, the preferred list mode causes the redirector program 12 to operate like a filter, only redirecting certain user data items based on whether the data item was sent from a sender on the preferred list or has certain message characteristics that if present will trigger or suppress redirection of the message. In the example of FIG. 1, if desktop system 26 was operated by a user on the preferred list of host system 10, and the preferred list option was activated, then message A would be redirected. If, however, desktop 26 was operated by a user not on the host system's preferred list, then message A would not be redirected, even if the user of the host system had configured the redirector to push messages of type A. The user of the host system 10 can configure the preferred list directly from the desktop system, or, alternatively, the user can then send a command message (such as C) from the mobile device 24 to the desktop system 10 to activate the preferred list mode, or to add or delete certain senders or message characteristics from the preferred list that was previously configured. It should be appreciated that a redirection program could combine message characteristics and preferred sender lists to result in a more finely-tuned filter. Messages marked as low priority or that are simple return receipts or message read receipts, for example, could always be suppressed from redirection while messages from a particular sender would always be redirected.

After the redirector has determined that a particular message should be redirected, and it has prepared the message for redirection, the software 12 then sends the message A to a secondary memory store located in the mobile device 24, using whatever means are necessary. In the preferred embodiment this method is to send the message A back over the LAN 14, WAN 18, and through the store-and-forward gateway 20 to the mobile data communication device 24. In doing so, the redirector preferably repackages message A as an E-mail with an outer envelope B that contains the addressing information of the mobile device 24, although alternative repackaging techniques and protocols could be used, such as a TCP/IP repackaging and delivery method (most commonly used in the alternative server configuration shown in FIG. 2). The wireless gateway 20 requires this outer envelope information B in order to know where to send the redirected message A. Once the message (A in B) is received by the mobile device 24, the outer envelope B is removed and the original message A is placed in the secondary memory store within the mobile device 24. By repackaging and removing the outer envelope in this manner, the present invention causes the mobile computer 24 to appear to be at the same physical location as the host system 10, thus creating a transparent system.

In the case where message C is representative of an external message from a computer on the Internet 18 to the host system 10, and the host 10 has been configured to redirect messages of type C, then in a similar manner to message A, message C would be repackaged with an outer envelope B and transmitted to the user's mobile device 24. In the case where message C is representative of a command message from the user's mobile device 24 to the host system 10, the command message C is not redirected, but is acted upon by the host system 10.

If the redirected user data item is an E-mail message, as described above, the user at the mobile device 24 sees the original subject, sender's address, destination address and carbon copy. When the user replies to this message, or when the user authors a new message, the software operating at the mobile device 24 adds a similar outer envelope to the reply message (or the new message) to cause the message to be routed first to the user's host system 10, which then removes the outer envelope and redirects the message to the final destination, such as back to computer 26. In the preferred embodiment, this results in the outgoing redirected message from the user's host system 10 being sent using the E-mail address of the host mailbox, rather than the address of the mobile device, so that it appears to the recipient of the message that the message originated from the user's desktop system 10 rather than the mobile data communication device. Any replies to the redirected message will then be sent to the desktop system 10, which if it is still in redirector mode, will repackage the reply and resend it to the user's mobile data device, as described above.

Figure 2:
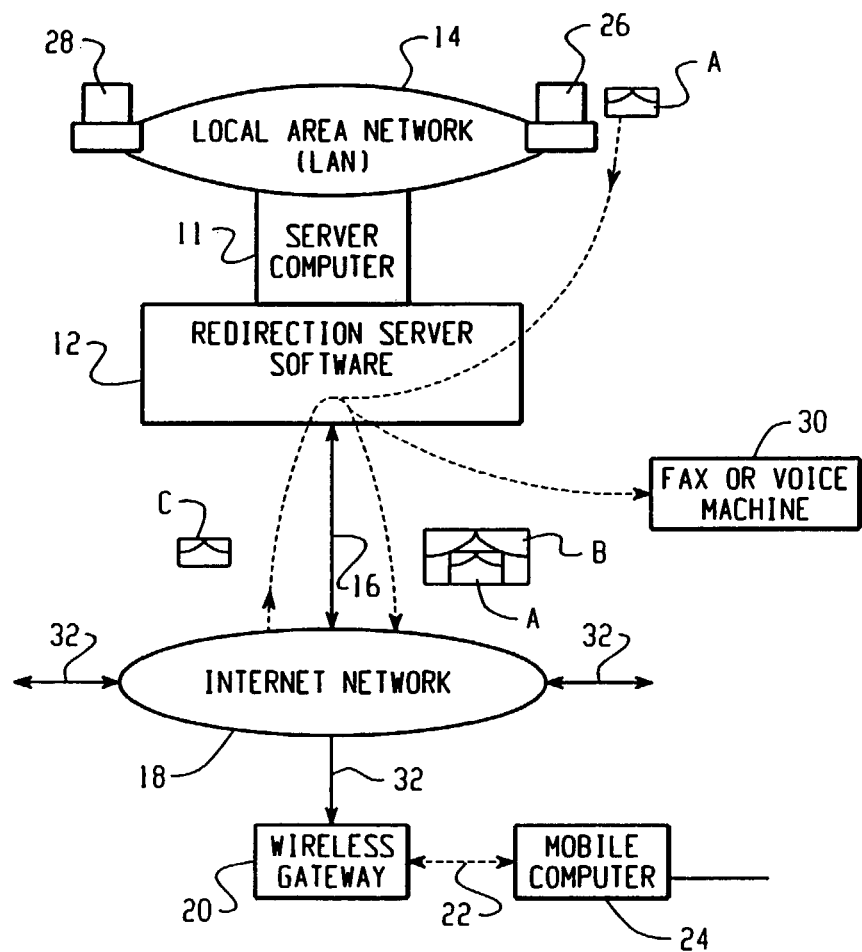
FIG. 2 is a system diagram showing the redirection of user data items from a network server (host system) to the user's mobile data communication device, where the redirector software is operating at the server.

FIG. 2 is an alternative system diagram showing the redirection of user data items from a network server 11 to the user's mobile data communication device 24, where the redirector software 12 is operating at the server 11. This configuration is particularly advantageous for use with message servers such as Microsoft's® Exchange Server, Lotus™ Notes Message Server and IMAP4 Message Servers which is normally operated so that all user messages are kept in one central location or mailbox store on the server instead of in a store within each user's desktop PC. This configuration has the additional advantage of allowing a single system administrator to configure and keep track of all users having messages redirected. If the system includes encryption keys, these too can be kept at one place for management and update purposes.

In this alternative configuration, server 11 preferably maintains a user profile for each user's desktop system 10, 26, 28, including information such as whether a particular user can have data items redirected, which types of message and information to redirect, what events will trigger redirection, the PIN of the users' mobile data communication device 24, the type of mobile device, and the user's preferred list, if any. The event triggers are preferably detected at the user's desktop system 10, 26, 28 and can be any of the external, internal or network events listed above. The desktop systems 10, 26, 28 preferably detect these events and then transmit a message to the server computer 11 via LAN 14 to initiate redirection. Although the user data items are preferably stored at the server computer 11 in this embodiment, they could, alternatively, be stored at each user's desktop system 10, 26, 28, which would then transmit them to the server computer 11 after an event has triggered redirection.

As shown in FIG. 2, desktop system 26 generates a message A that is transmitted to and stored at the host system 11, which is the network server operating the redirector program 12. The message A is for desktop system 10, but in this embodiment, user messages are stored at the network server 11. When an event occurs at desktop system 10, an event trigger is generated and transmitted to the network server 11, which then determines who the trigger is from, whether that desktop has redirection capabilities, and if so, the server (operating the redirector program) uses the stored configuration information to redirect message A to the mobile computer 24 associated with the user of desktop system 10.

As described above with reference to FIG. 1, message C could be either a command message from a user's mobile data communication device 24, or it could be a message from an external computer, such as a computer connected to the Internet 18. If the message C is from an Internet computer to the user's desktop system 10, and the user has redirection capabilities, then the server 11 detects the message C, repackages it using electronic envelope B, and redirects the repackaged message (C in B) to the user's mobile device 24. If the message C is a command message from the user's mobile device 24, then the server 11 simply acts upon the command message.

Figure 3:
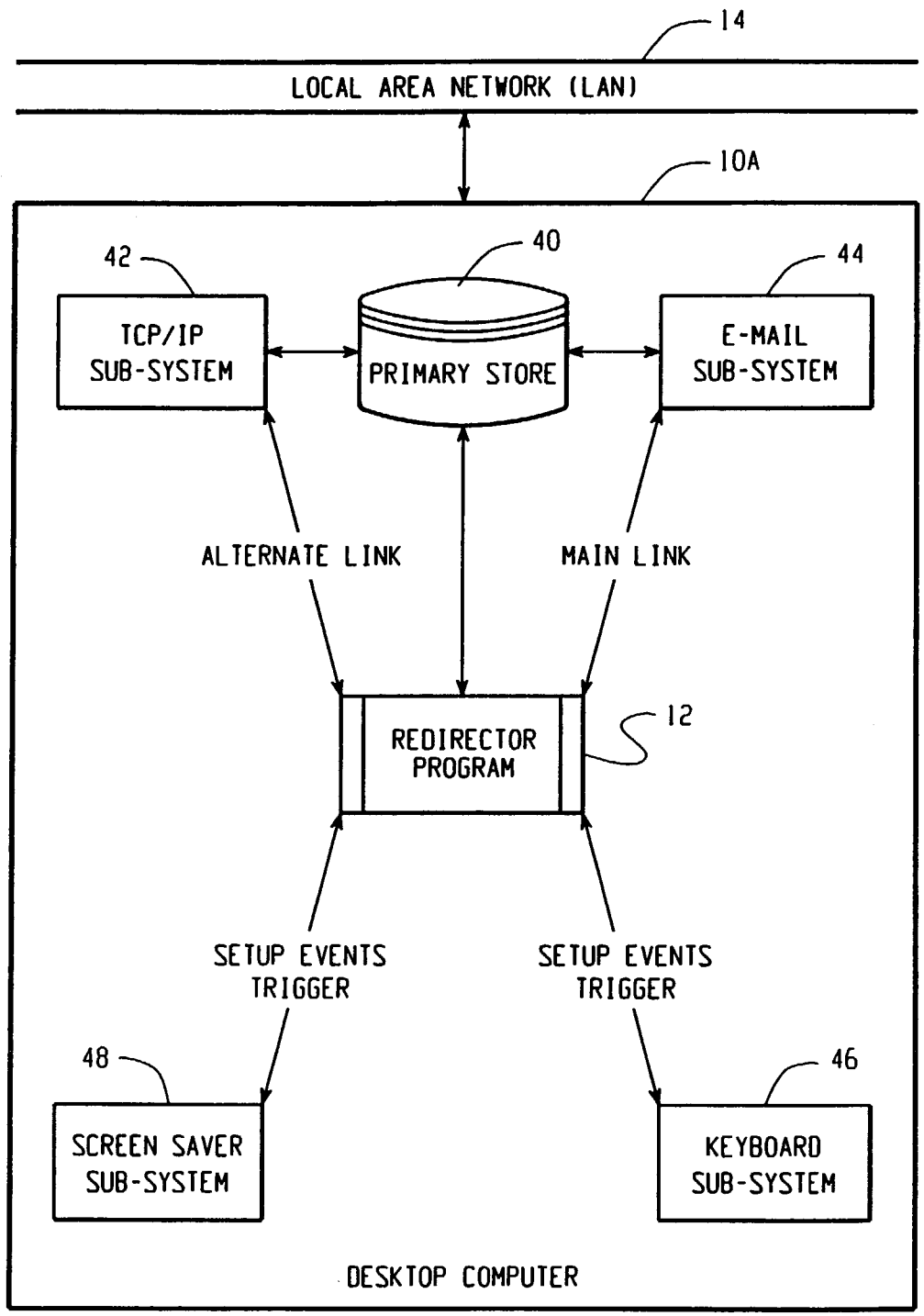
FIG. 3 is a block diagram showing the interaction of the redirector software with other components of the host system in FIG. 1 (the user's desktop PC) to enable the pushing of information from the host system to the user's mobile data communication device.

Turning now to FIG. 3, a block diagram showing the interaction of the redirector software 12 with additional components of the host system 10 of FIG. 1 (the desktop PC) to enable more fully the pushing of information from the host system 10 to the user's mobile data communication device 24 is set forth. These additional components are illustrative of the type of event-generating systems that can be configured and used with the redirector software 12, and of the type of repackaging systems that can be used to interface with the mobile communication device 24 to make it appear transparent to the user.

The desktop system 10 is connected to LAN 14, and can send and receive data, messages, signals, event triggers, etc., to and from other systems connected to the LAN 14 and to external networks 18, 22, such as the Internet or a wireless data network, which are also coupled to the LAN 14. In addition to the standard hardware, operating system, and application programs associated with a typical microcomputer or workstation, the desktop system 10 includes the redirector program 12, a TCP/IP sub-system 42, an E-mail sub-system 44, a primary data storage device 40, a screen saver sub-system 48, and a keyboard sub-system 46. The TCP/IP and E-mail subsystems 42, 44 are examples of repackaging systems that can be used to achieve the transparency of the present invention, and the screen saver and keyboard sub-systems 46, 48 are examples of event generating systems that can be configured to generate event messages or signals that trigger redirection of the user selected data items.

The method steps carried out by the redirector program 12 are described in more detail in FIG. 4. The basic functions of this program are: (1) configure and setup the user-defined event trigger points that will start redirection; (2) configure the types of user data items for redirection and optionally configure a preferred list of senders whose messages are to be redirected; (3) configure the type and capabilities of the user's mobile data communication device; (4) receive messages and signals from the repackaging systems and the event generating systems; and (5) command and control the redirection of the user-selected data items to the mobile data communication device via the repackaging systems. Other functions not specifically enumerated could also be integrated into this program.

The E-Mail sub-system 44 is the preferred link to repackaging the user-selected data items for transmission to the mobile data communication device 24, and preferably uses industry standard mail protocols, such as SMTP, POP, IMAP, MIME and RFC-822, to name but a few. The E-Mail subsystem 44 can receive messages A from external computers on the LAN 14, or can receive messages C from some external network such as the Internet 18 or a wireless data communication network 22, and stores these messages in the primary data store 40. Assuming that the redirector 12 has been triggered to redirect messages of this type, the redirector detects the presence of any new messages and instructs the E-Mail system 44 to repackage the message by placing an outer wrapper B about the original message A (or C), and by providing the addressing information, i.e. PIN value of the mobile data communication device 24 on the outer wrapper B. As noted above, this outer wrapper B is removed by the mobile device 24, and the original message A (or C) is then recovered, thus making the mobile device 24 appear to be the desktop system 10.

Figure 8:
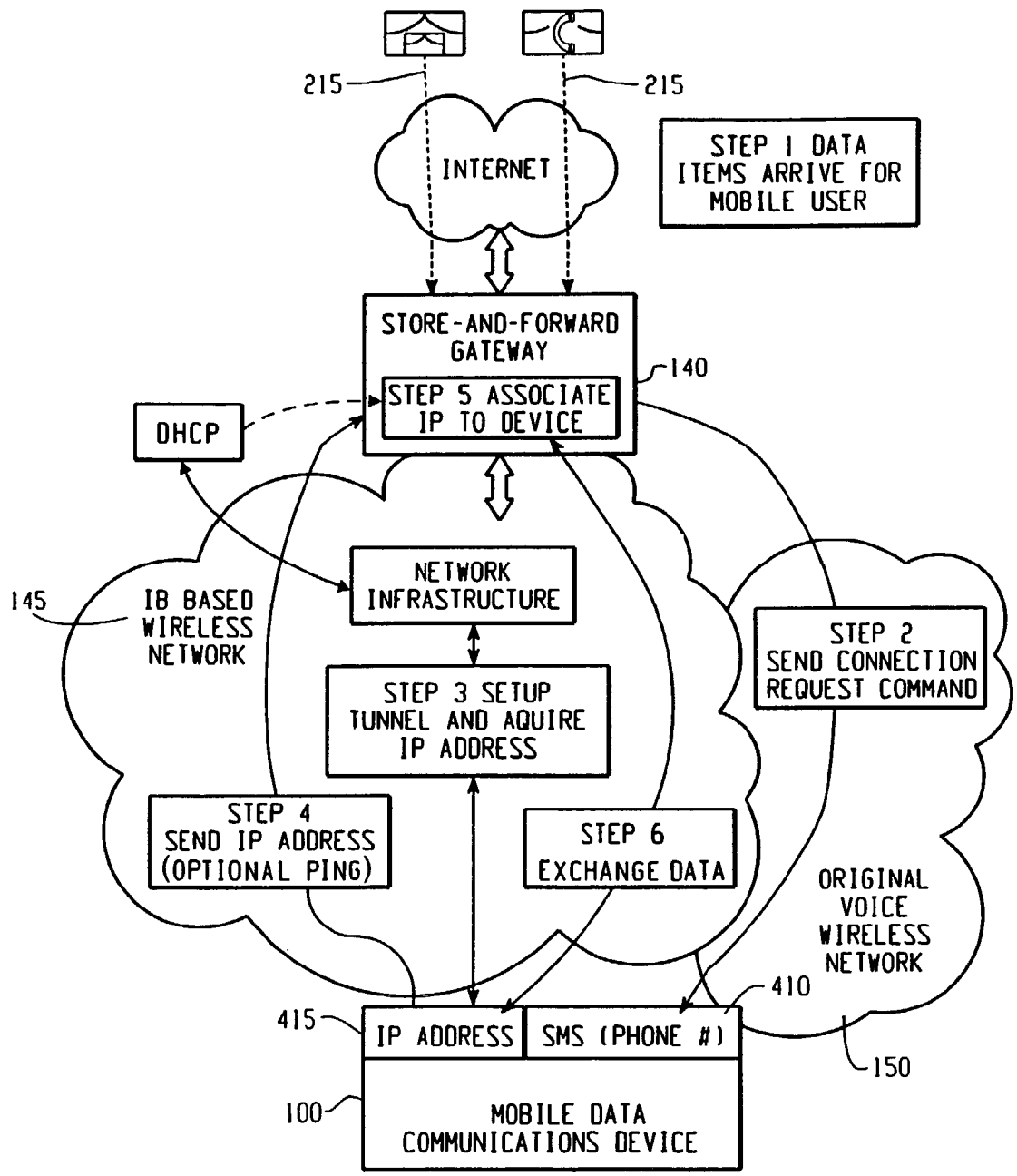
FIG. 8 sets forth the steps to redirect data items over the IP based wireless network to a mobile device.

In addition, the E-Mail sub-system 44 receives messages back from the mobile device 24 having an outer wrapper with the addressing information of the desktop system 10, and strips this information away so that the message can be routed to the proper sender of the original message A (or C). The E-Mail sub-that it has a current valid IP address for the particular mobile device 100. It can run an inactivity timer that matches the wireless network's 145 inactivity timer for tearing down tunnels, and clear the IP address for that mobile when the timer expires. Otherwise, it can implement an address assignment server 335 and monitor when IP addresses are revoked and assigned to mobiles. Following the two described IP tracking methods, the gateway 140 determines if it does have a valid IP address. If a valid address does exist, then the gateway 140 will attempt to bypass steps 2-5 in FIG. 8 and proceed directly to step 6 directly, which is to send the stored data immediately to the mobile device 100.

If the validity of the mobile device's 100 IP address is in question, or if there is no mapping of the particular mobile (i.e., there has never been a packet sent to the device, or if the DHCP has indicated that the IP address was revoked), then the gateway 140 performs the additional steps 2-5.

In step 2, the gateway 140 sends a connection request command over the voice network control channel to the mobile device's 100 voice address, in this case shown as an SMS phone number 410. In some networks, like GPRS, it is also possible to send the connection request command over an SMS channel (or some other control channel) of the data network. In this case, the SMS phone number is also used but it does not interfere with the voice component of the device. This connection request command could be implemented in many ways. In one embodiment, the connection request command could be a PING command. For single-mode devices that only communicate over the wireless packet network 145, the connection request command could be sent over a low-bandwidth control channel of the packet network 145.

Figure 13A:
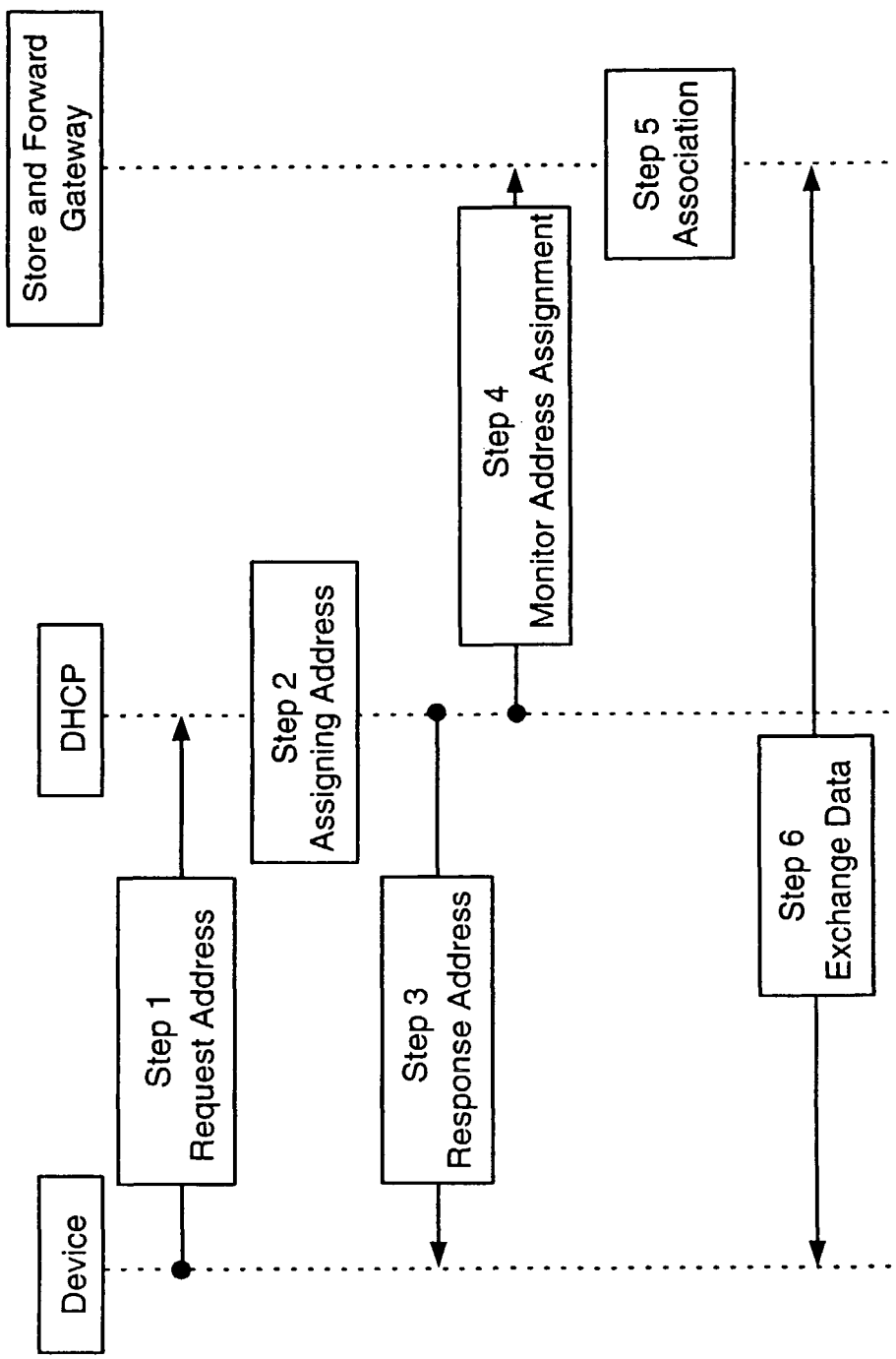
FIGS. 13a and 13b are sequence diagrams illustrating actions taken at the mobile, DHCP and store and forward gateway after a connection request command is made to the mobile.
Figure 13B:
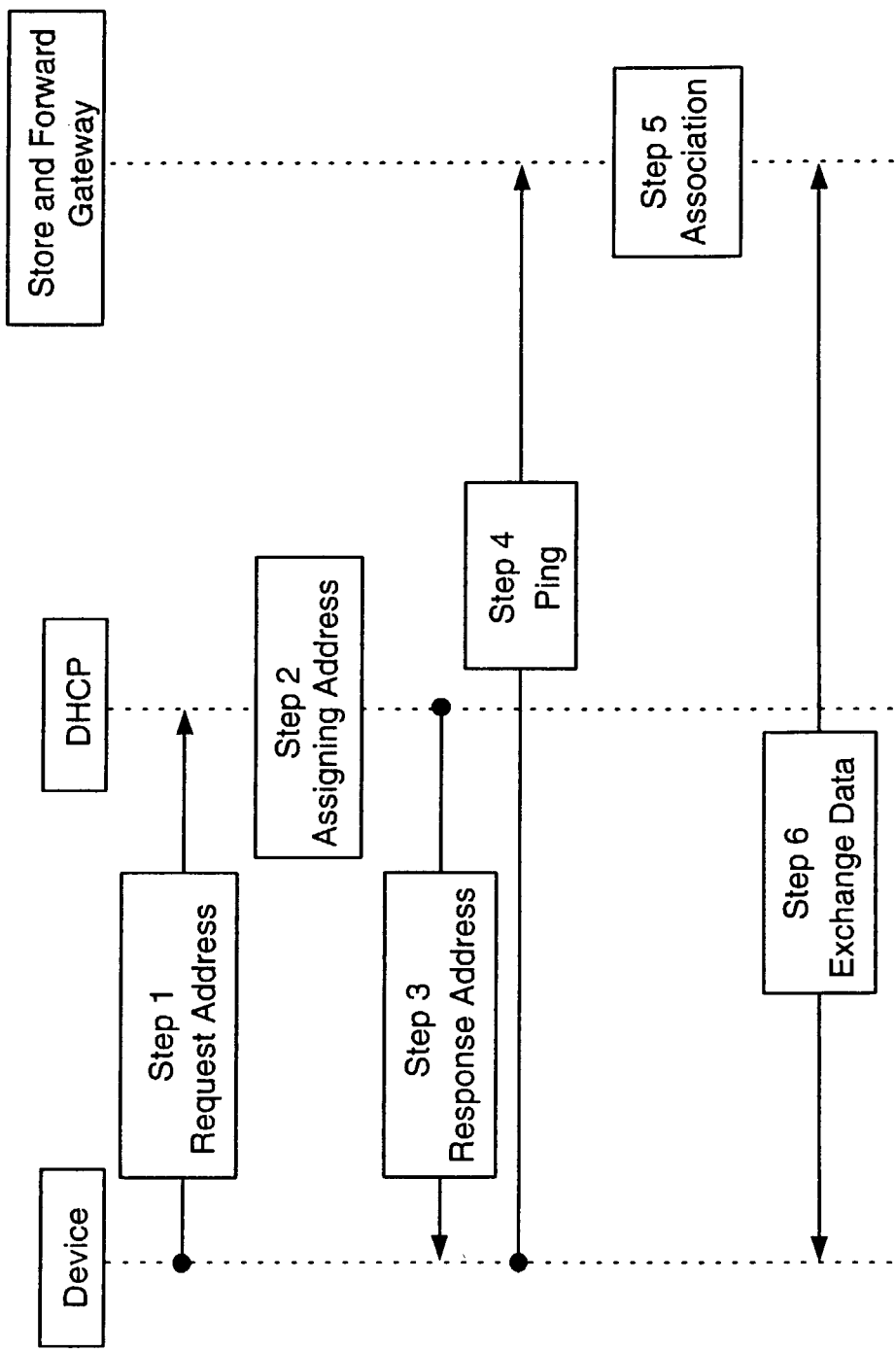

There are two responses to step 2. At this point, in addition to FIG. 8 reference may also be made to FIGS. 13*a* and *b* to further illustrate the two responses. FIGS. 13*a* and 13*b* are sequence diagrams illustrating actions taken at the mobile, DHCP and store and forward gateway after a connection request command is made to the mobile. FIG. 13*a* is applicable if the store and forward gateway can directly detect an assignment of a network address by the DHCP while FIG. 13*b* is applicable if the store and forward gateway cannot directly detect the assignment. Preferably, the mobile device 100 knows which of the two responses to execute because the gateway 140 instructs the mobile in the connection request command sent in step 2. Alternatively, the mobile knows which of the two responses to execute based on the operator of the wireless network (i.e., the operator may program each device at initialization). If the store-and-forward gateway 140 includes a DHCP server 335, has control over the data channel to the DHCP server 335, or has some capability to directly detect the assignment of a network address by the DHCP server 335, then the mobile simply needs to perform step 3 and can skip step 4. In step 3, the mobile device transmits a network address request to the network 145, which then allocates a network address to the mobile device 100. In this situation, the store-and-forward gateway 140 will be automatically aware of the new IP address assignment after step 3 has taken place and will immediately perform steps 5 and 6, which results in the data arriving to the mobile. If the gateway has no control over the DHCP server 335 or detection capabilities of assignments by the DHCP server, however, then the mobile device 100 performs step 3 followed by step 4, which causes the newly acquired network address to be sent back to the store-and-forward gateway 140. In this example the network address is shown as an IP address, as it is assumed the mobile device 100 is operating on a IP based wireless network. Other forms of packet addressing, however, could be used with this invention.

Alternatively, the mobile device 100 could be configured to periodically execute step 3 in order to acquire an IP address, without first receiving the connection request command in step 2. In this situation, step 2 could be omitted. This automatic sending of the IP address at a configured interval is seen as less efficient, however, as the user may have to wait for several minutes for information that is waiting to be delivered to their mobile device 100. Normally, the configured interval will be loaded into the mobile device as part of its initial configuration, although it could be updated over-the-air using a secure device updating protocol.

When step 4 is complete, the store-and-forward gateway 140 will be provided with enough information to map a mobile device 100 to an IP address. This mapping, shown as step 5, is a necessary step for building, addressing and sending an IP packet to the mobile device 100. The initial versions of most IP based wireless networks 145, like the GPRS network, do not allow a gateway 140 to initiate a data link (PDP context) to the mobile device 100. One of the main reasons for this limitation is because most networks continue to focus on IPv4 (Internet Protocol version 4), which is the original IP definition used within the Internet. This has resulted in a very limited address space and the inability to assign each mobile device 100 with a fixed IP address. Therefore, wireless network operators have allocated only a small number of 'real IP addresses' and use a dynamic address assignment as a preferred strategy. Mobile devices 100 must therefore have an alternate permanent identifier, and servers must maintain a dynamic link between that permanent identifier of the mobile devicde and the temporary IP address of the mobile device.

Figure 9A:
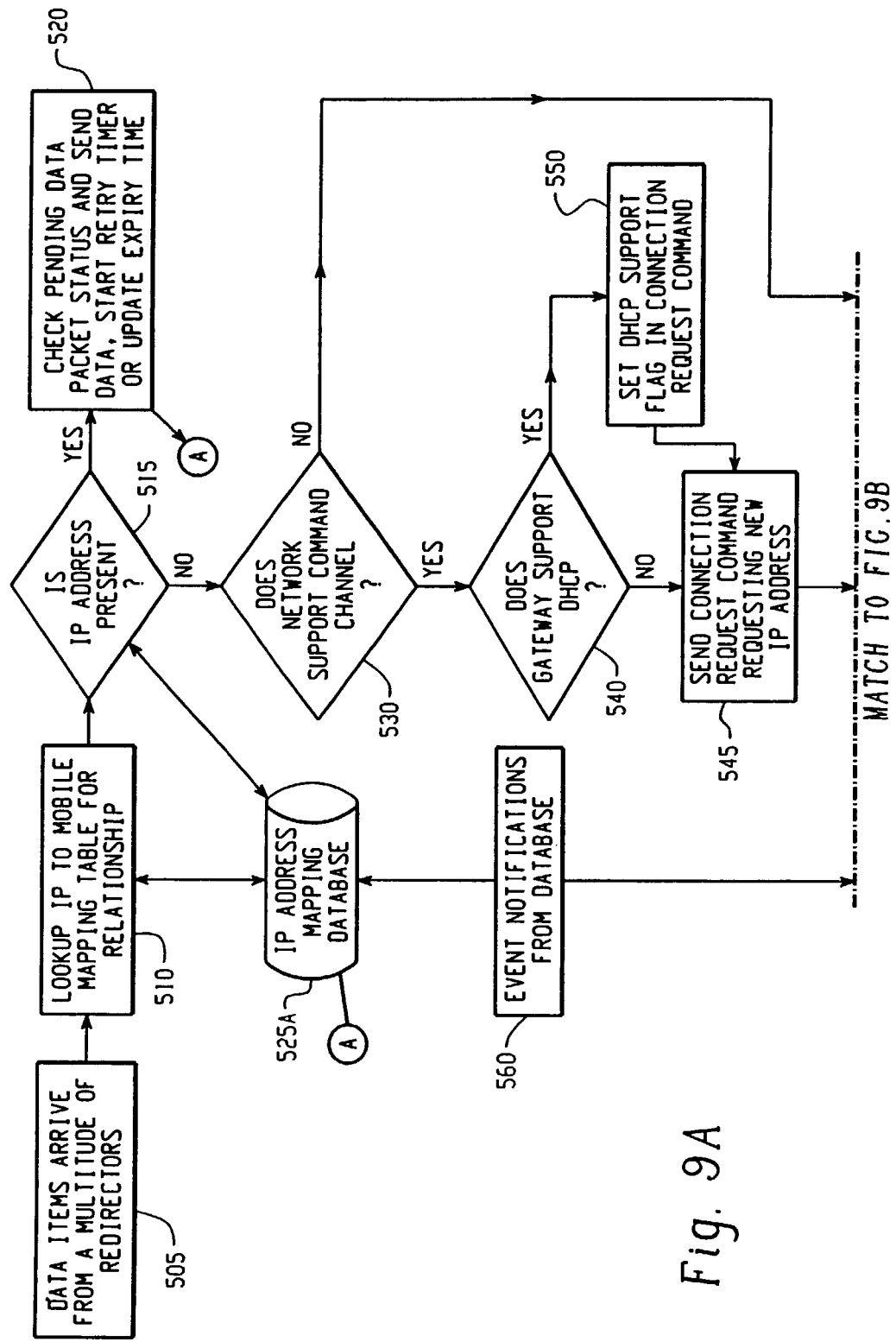
FIG. 9 is a data flow diagram that depicts how a store-and-forward gateway handles incoming data from redirector programs going to mobile devices.
Figure 9B:
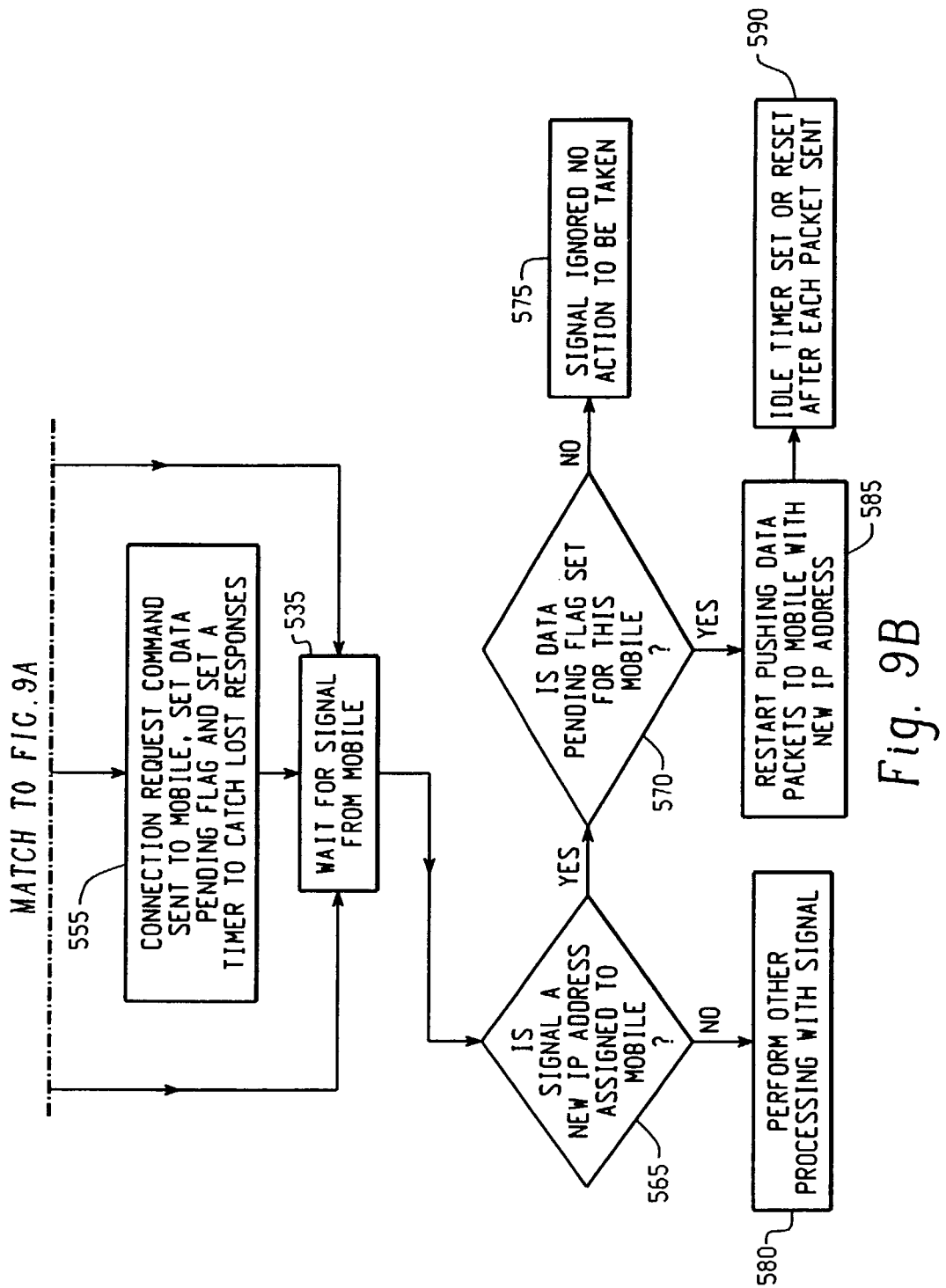

After the association of mobile device 100 to IP address is completed, step 6 can be performed. In this final step, the store-and-forward gateway 140 sends an IP Packet (either TCP or UDP packet) via the network tunnel to the same mobile device 100 that established the tunnel 325. With the current IP address available to the gateway 140, each data packet can be addressed correctly and sent to the device 100 until the inactivity or out-of-coverage timer expires and the entire IP address reacquiring sequence is performed again. FIGS. 9A and 9B provide a detailed algorithm to describe these steps programmatically.

FIG. 9A is a data flow diagram that depicts how a store-and-forward gateway 140 handles incoming data from redirector programs going to mobile devices. Beginning at step 505, data items (215) from a multitude of redirector programs 12 arrive at the gateway 140. Each time a data item 215 arrives at the gateway 140, the gateway 140 performs a lookup to determine the IP address to mobile device mapping relationship 510. The data item 205 provides information about the destination mobile to enable this lookup, as part of the packaging technique described above. This interaction takes place with a database that holds the IP address to mobile address mapping 525A. For one skilled in the art, this database could be a cache mechanism within RAM. This mapping database 525A could be an Oracle™ database, a Sybase™ database, or some form of LDAP database. This database is labeled (A). Once the database mapping information is retrieved, the gateway 140 determines, in step 515, if an IP address is present in the database for the particular mobile device. If there is an address present, then the data item can be immediately sent to the mobile device 100 in step 520. In this step 520, the gateway 140 also starts a retry timer in case the data item does not arrive at the mobile device 100 in a specified time period, in which event it is retransmitted from the gateway 140. If the mobile cannot receive the data item after multiple retries, as indicated by the lack of receive acknowledgements, then an expired time value is placed in the mobile's record within the database 525 to indicate that the IP address has gone stale and should not be used.

If there is no IP address for the particular mobile in the database 525A, or if the address has expired, then the gateway 140 determines whether the mobile supports a control channel, such as a connection over a parallel voice network, or a low bandwidth (i.e. supporting only very small data messages) control channel on the data network. If a command channel is not supported, then the gateway 140 must wait for a spontaneous address request message from the mobile device 100 in step 535. If the network does support command messages, however, then the gateway 140 determines if it has implemented a DHCP server in step 540. If the gateway has implemented a DHCP server, then a flag is set to indicate this support within the command message in step 550. In this instance, the command message is a connection request command. Then, in step 545, the connection request command is sent to the mobile, with or without the DHCP supported flag set. A timer is also set to indicate that data is pending for this mobile, and a timer is set to catch any situations where the response is missed 555.

At this point, the gateway 140 is waiting for a message from the mobile device 100, or from the DHCP server 335. As shown in FIG. 9B, a signal from the mobile device 100, or the DHCP server 335 will be written to the IP Address mapping storage area 525. When this happens, the database 525 will notify the gateway in step 560 using traditional callback methods. This callback notification of an event 560 will cause the gateway 140 to check whether a new IP address has been assigned to this mobile device 100 at step 565. If the signal from the mobile indicates that a new IP address has been assigned, then control passes to step 570, which determines if the data pending flag is set for this particular mobile device. If there is no data pending, then the signal is ignored 575. If, however, there is data pending for the mobile device 100, then at step 585 the gateway starts to push TCP or UDP data packets over IP to the mobile device using the new IP address assigned. After each data packet is sent, the idle timer is set or reset for this mobile device 100 to help ensure the 1P address is kept current and is valid.

Figure 10A:
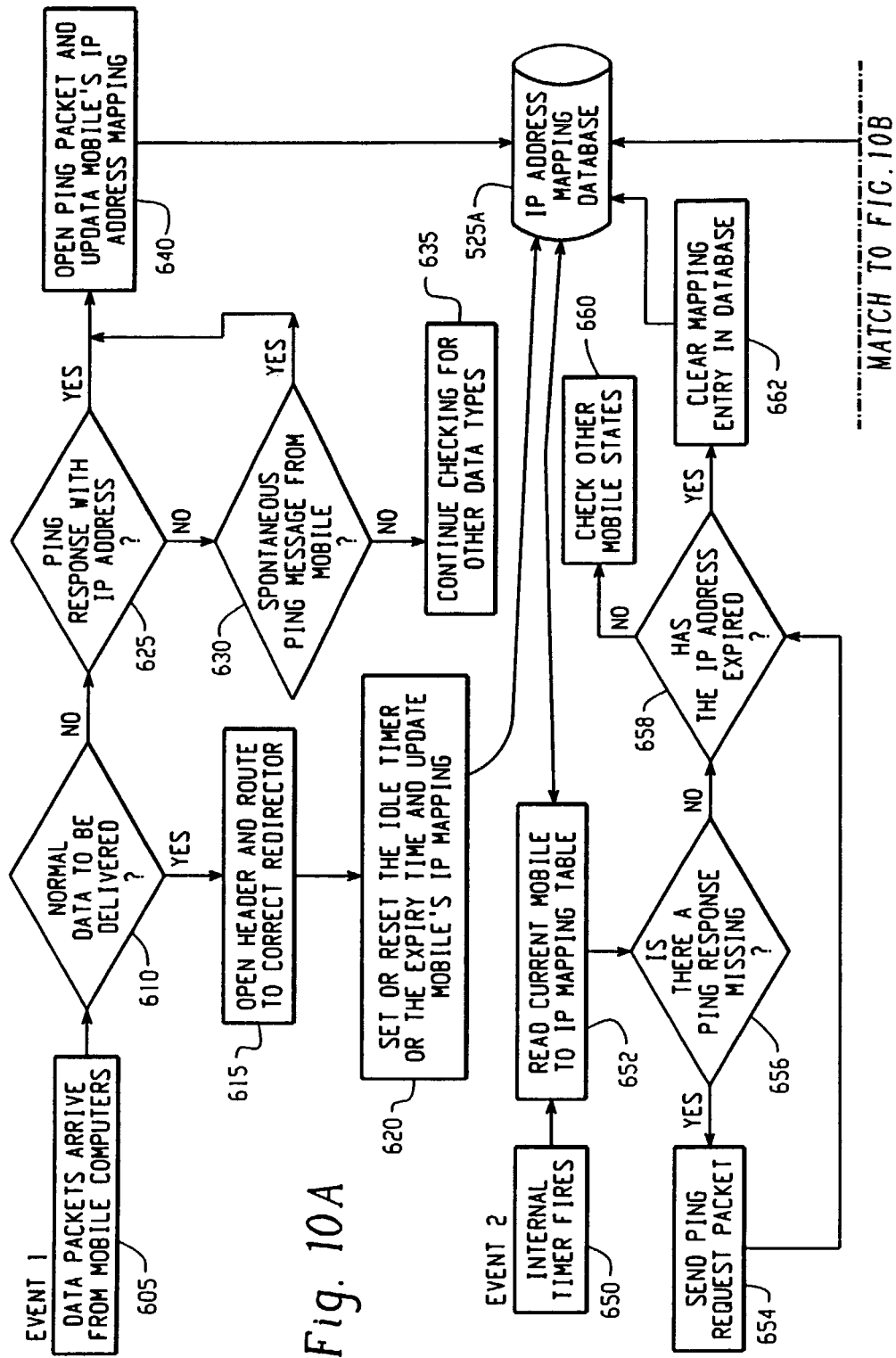
FIG. 10 is a continuation of FIG. 9, and is a data flow diagram of how a mobile address to IP address mapping database is updated with external and internal events.
Figure 10B:
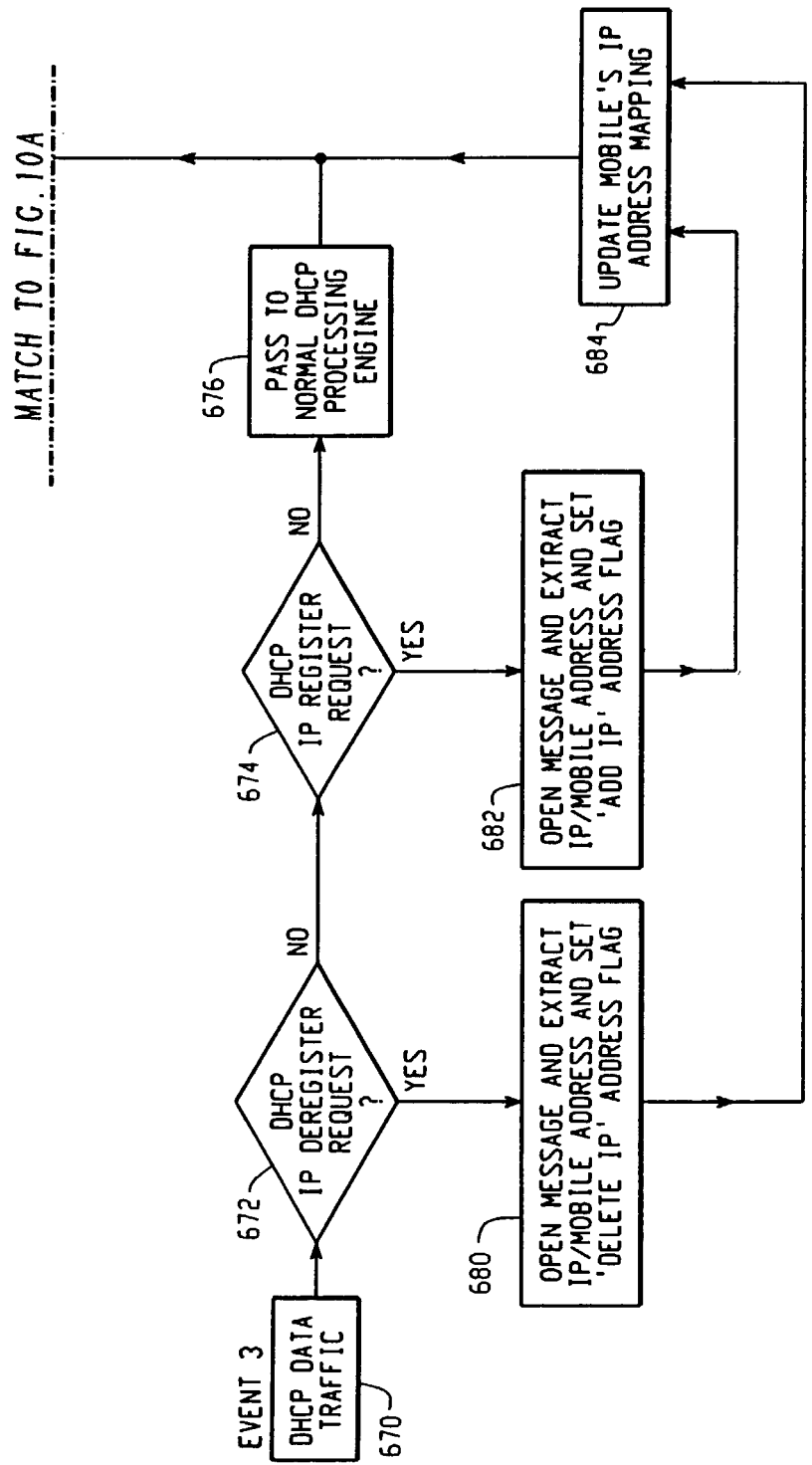

FIG. 10 is a continuation of FIG. 9, and is a data flow diagram of how a mobile address to IP address mapping database 525A is updated with external and internal events. Beginning at step 605 in FIG. 10A, data packets arrive at the gateway 140 from the mobile devices 100. These packets are checked to see if they are normal data messages or control messages in step 610. If the packet is a normal data packet, then the header of the packet is opened at step 615, and the gateway 140 routes the data to the correct redirector 12. The idle timer is also set or reset for this mobile device to ensure that the IP address is kept current and valid at step 620. Additionally, the IP mapping database 525A is updated in case the IP address for this mobile changed and an expiry timer is set for the mobile to indicate when the IP address might go stale.

If the packet is not a normal data packet, however, then the gateway 140 determines, in step 625, if it is a response control packet from the mobile device, such as a PING response control packet 640 to the connection request command sent in FIG. 9. As indicated previously, this connection request command could be a PING command message. If it is not a PING response packet, then the gateway 140 determines if the packet is a spontaneous update packet at step 630. This spontaneous update packet (or spontaneous address request packet) may be used by the mobile to obtain a valid IP address if the wireless network 145 does not support a command channel. In either case, the packet is opened and the new IP address is used to update the mobile to IP address mapping 640 within the address mapping database 525A. If the message from the mobile device 100 is not one of these two control data types, then further checks may be performed at step 635.

The second type of events that can affect the mapping database 525A are internal timer events. The gateway 140 includes several timers that are set and reset for tracking mobile device 100 states. When one of these timers expires at step 650 it must be checked. Another method to perform this would be to keep an expiry time within the table entry for this device, shown in several parts within FIGS. 9 and 10. This expiry timer would be read each time a packet is to be sent to the device to see if the IP address had gone stale. Each time a packet is sent or received from the device, the expiry time is updated to reflect the new activity. In this example, if a timer expires the gateway 140 will check the mobile's database entry to determine the state of the mobile device in step 652. If there has been no response to a PING request packet (i.e., a connection request command) at step 656, then the gateway will send another PING packet to the mobile device 654. Once this is done, or if there has been no missed PING responses, the gateway 140 determines if the IP address has expired at step 658. If the address has not expired, then other timer related checks are performed at step 660. If the IP address has expired, however, then the gateway 140 will clear the IP address value from the database entry for this mobile device at step 662 to ensure it cannot be used later.

The third type of event that can effect the mobile IP address mapping database 525A is external DHCP requests (step 670). The first check on these events is to see if a DHCP IP de-register is being requested at step 672. If it is, then a flag is set to indicate that the mapping entry for this mobile should be cleared at step 680. If it is not this type of DHCP request, then the gateway 140 determines if it is a DHCP IP register request at step 674. If it is, then a flag is set to indicate that the IP address should be set for this mobile at step 682. If the DHCP request is neither of these two, however, then it is passed to the normal DHCP processing logic at step 676. If the mobile's IP address mapping must be modified, then the IP address mapping database 525A is updated at step 684. This will either cause the mapping to be cleared (step 680) or to be set (step 682), which in turn will cause a database event notification to occur. Once this update is complete the normal DHCP processing is completed with the requests 684.

Figure 11A:
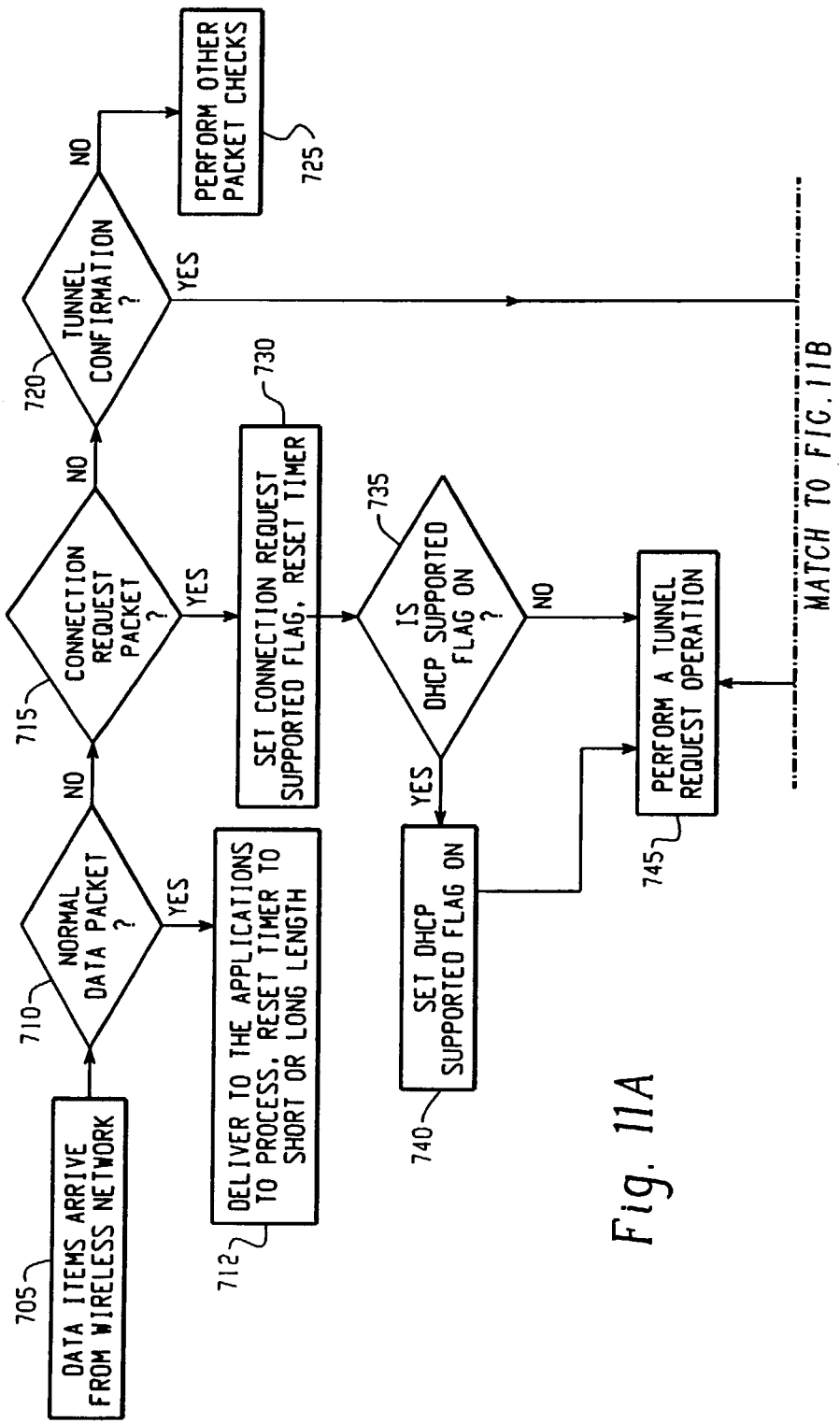
FIG. 11 is a data flow diagram of the mobile device's logic for communicating with the store-and-forward gateway.

FIG. 11A is a data flow diagram of the mobile devices' logic for communicating with the store-and-forward gateway 140. At step 705, data items arrive in from the wireless network, either from the IP based wireless network 145, or the voice wireless network 150. If the data item is a data packet 710 from the IP based wireless network 145, then it will be delivered to higher-level applications for processing and possibly presentation to the user. Whenever data is received, a poll timer is reset to indicate that the current IP address is valid. Otherwise, the mobile determines if the data item is a connection request command at step 715. If the data item is not a connection request command, then at step 720 the mobile determines if the data item is a tunnel confirmation packet. The tunnel confirmation packet is transmitted from the wireless data network 145 to the mobile device after a wireless network tunnel 325 has been established. If it is not a tunnel confirmation packet, then the mobile may perform other checks at step 725, depending on the other features of the mobile device.

If the packet is a connection request command as determined at step 715, then a flag is set at step 730 to indicate that the gateway 140 is able to support connection requests on the current wireless network 145 and/or 150. At step 735, an additional check of the packet is performed to see if the gateway 140 also supports DHCP. If so, then a flag is set 740 to indicate that after the tunnel confirmation packet is received, there is no need to forward the new IP address to the gateway 140, as it automatically receives this information when the tunnel is created.

Whether or not the gateway 140 supports DHCP, a tunnel request (or address request) is made by the mobile device 100 to request a new tunnel and a new IP address at step 745. If the packet received is a tunnel confirmation message at step 720, then the flow diagram proceeds to FIG. 11B.

Figure 11B:
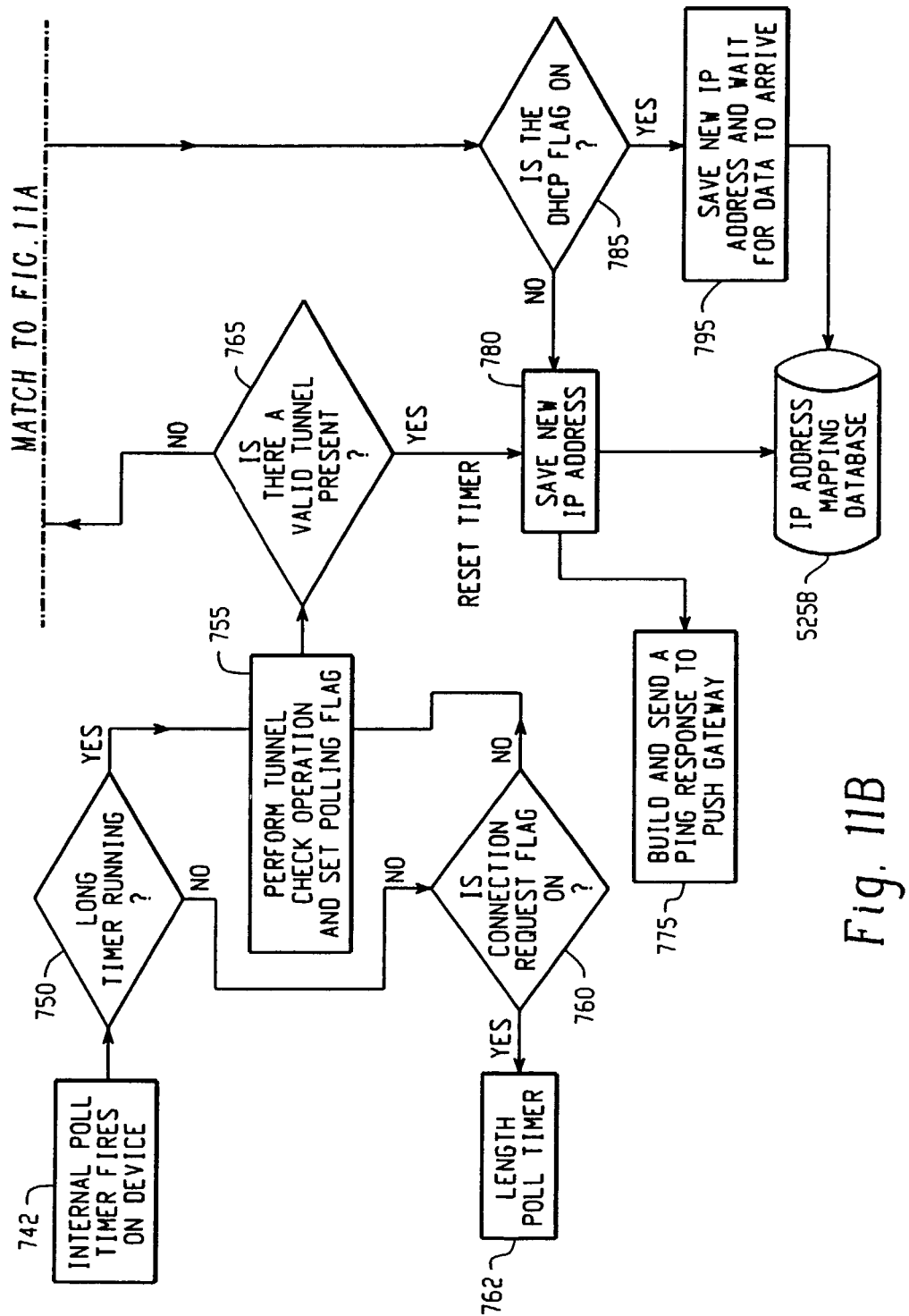

In FIG. 11B the gateway first determines if the DHCP flag is turned on at step 785. If it is, then the new IP address is saved 795 in the IP address mapping database 525B. This address mapping database 525B is a smaller version of the host address mapping database 525A, which contains all mobile devices and their current states. If there is no DHCP support, then the new IP address is saved at step 780, and the mobile sends an address request response message to the gateway 140 to inform it of the new IP address for data exchange at step 775.

When the mobile device 100 first starts it is necessary to run a poll timer just in case the gateway 140 is unable to send connection request packets. Whenever the poll timer expires 742, the software in the mobile determines if a long or a short timer is running 750. The long timer is used as a fail-safe mechanism to ensure the gateway 140 never gets confused about the state of the device. The long timer is used primarily when connection requests are supported. The long timer could be hours or days long and when it expires causes a tunnel check operation to be executed 755. If a short poll timer is running, the mobile determines if a connection request has ever been received by checking the connection request flag 760. If a connection request was received, then the flag is turned on, which will cause the poll timer to be lengthened to the long timeout value. Otherwise, the mobile will perform a tunnel checking operation, which would involve sending an IP packet to itself or to the gateway, on what should be a valid tunnel 755. The IP based wireless network 145 will return an error if the device 100 does not have a valid tunnel established with the gateway 140. If the tunnel 765 is invalid or not present, the mobile device 100 performs a tunnel request operation 745 to the network to acquire a new tunnel and a new IP address. If the tunnel is valid, then the current IP address is saved and immediately sent to the gateway 140 via a connection response message.

Having described in detail the preferred embodiments of the present invention, including the preferred methods of operation, it is to be understood that this operation could be carried out with different elements and steps. This preferred embodiment is presented only by way of example and is not meant to limit the scope of the present invention, which is defined by the following claims.

We claim:

1. A method operable at a store-and-forward server associated with a wide area packet network and an Internet Protocol (IP)-based wireless network, the method comprising:
   maintaining, at the store-and-forward server, a mapping between a temporary Internet Protocol (IP) address of a mobile data communication device and a unique permanent identifier of the mobile data communication device;
   maintaining, at the store-and-forward server, a mapping between the unique permanent identifier of the mobile data communication device and a phone number associated with the mobile data communication device;
   receiving a message redirected from a message server over the wide area packet network, the message contained in an envelope that includes the unique permanent identifier of the mobile data communication device; and
   upon determining that the temporary IP address of the mobile data communication device is invalid, performing the following:
   transmitting a connection request command to the phone number of the mobile data communication device to instruct the mobile data communication device to acquire an IP address;
   receiving from the mobile data communication device a new IP address assigned to the mobile data communication device; and
   using the new IP address received from the mobile data communication device, transmitting the message to the mobile data communication device over the IP-based wireless network.

2. The method as set forth in claim 1, further comprising: upon determining that the temporary IP address of the mobile data communication device is valid, transmitting the message to the mobile data communication device over the IP-based wireless network using the temporary IP address as destination information.

3. The method as set forth in claim 1, further comprising: updating the mapping between the unique permanent identifier of the mobile data communication device and the mobile data communication device's IP address.

4. The method as set forth in claim 3, further comprising: upon updating the mapping between the unique permanent identifier of the mobile data communication device and the mobile data communication device's IP address, setting an inactivity timer with respect to the mobile data communication device's IP address.

5. The method as set forth in claim 3, further comprising: upon updating the mapping between the unique permanent identifier of the mobile data communication device and the mobile data communication device's IP address, setting an out-of-range timer with respect to the mobile data communication device's IP address.

6. The method as set forth in claim 1, wherein the mapping between the unique permanent identifier of the mobile data communication device and the phone number associated with the mobile data communication device is initialized based on information provided by the mobile data communication device to the store-and-forward server at startup.

7. The method as set forth in claim 1, wherein the phone number associated with the mobile data communication device is a Short Message Service (SMS) phone number.

8. The method as set forth in claim 1, wherein the unique permanent identifier of the mobile data communication device is at least one of a Personal Identification Number (PIN), International Mobile Subscriber Identity (IMSN) and Mobile Subscriber ISDN Number (MSISDN).

9. A store-and-forward server associated with a wide area packet network and an Internet Protocol (IP)-based wireless network, the store-and-forward server comprising:
   means configured to maintain a mapping between a temporary Internet Protocol (IP) address of a mobile data communication device and a unique permanent identifier of the mobile data communication device;
   means configured to maintain a mapping between the unique permanent identifier of the mobile data communication device and a phone number associated with the mobile data communication device;
   means for processing a message redirected from a message server over the wide area packet network, the message contained in an envelope that includes the unique permanent identifier of the mobile data communication device; and
   means, responsive to determining that the temporary IP address of the mobile data communication device is invalid, for performing the following:
   transmitting a connection request command to the phone number of the mobile data communication device to instruct the mobile data communication device to acquire an IP address;
   receiving from the mobile data communication device a new IP address assigned to the mobile data communication device; and
   using the new IP address received from the mobile data communication device, transmitting the message to the mobile data communication device over the IP-based wireless network.

10. The store-and-forward server as set forth in claim 9, further comprising means, responsive to determining that the temporary IP address of the mobile data communication device is valid, for transmitting the message to the mobile data communication device over the IP-based wireless network using the temporary IP address as destination information.

11. The store-and-forward server as set forth in claim 9, further comprising means for updating the mapping between the unique permanent identifier of the mobile data communication device and the mobile data communication device's IP address.

12. The store-and-forward server as set forth in claim 11, further comprising means, responsive to updating the mapping between the unique permanent identifier of the mobile data communication device and the mobile data communication device's IP address, for setting an inactivity timer with respect to the mobile data communication device's IP address.

13. The store-and-forward server as set forth in claim 11, further comprising means, responsive to updating the mapping between the unique permanent identifier of the mobile data communication device and the mobile data communication device's IP address, for setting an out-of-range timer with respect to the mobile data communication device's IP address.

14. The store-and-forward server as set forth in claim 9, wherein the mapping between the unique permanent identifier of the mobile data communication device and the phone number associated with the mobile data communication device is initialized based on information provided by the mobile data communication device to the store-and-forward server at startup.

15. The store-and-forward server as set forth in claim 9, wherein the phone number associated with the mobile data communication device is a Short Message Service (SMS) phone number.

16. The store-and-forward server as set forth in claim 9, wherein the unique permanent identifier of the mobile data communication device is at least one of a Personal Identification Number (PIN), International Mobile Subscriber Identity (IMSN) and Mobile Subscriber ISDN Number (MSISDN).

17. A non-transitory computer-accessible medium having a sequence of instructions which, when executed by a processing entity, effectuate communication of information between a message server and a mobile data communication device via a wide area packet network and an Internet Protocol (IP)-based wireless network, the non-transitory computer-accessible medium comprising:
   a code portion configured to maintain a mapping between a temporary Internet Protocol (IP) address of a mobile data communication device and a unique permanent identifier of the mobile data communication device;
   a code portion configured to maintain a mapping between the unique permanent identifier of the mobile data communication device and a phone number associated with the mobile data communication device;
   a code portion configured to process a message redirected from the message server over the wide area packet network, the message contained in an envelope that includes the unique permanent identifier of the mobile data communication device; and
   a code portion, responsive to determining that the temporary IP address of the mobile data communication device is invalid, configured to perform the following:
   transmitting a connection request command to the phone number of the mobile data communication device to instruct the mobile data communication device to acquire an IP address;
   processing a new IP address received from the mobile data communication device that has been obtained from the IP-based wireless network; and
   using the new IP address received from the mobile data communication device, transmitting the message to the mobile data communication device over the IP-based wireless network.

18. The non-transitory computer-accessible medium as set forth in claim 17, further comprising a code portion, responsive to determining that the temporary IP address of the mobile data communication device is valid, configured to transmit the message to the mobile data communication device over the IP-based wireless network using the temporary IP address as destination information.

19. The non-transitory computer-accessible medium as set forth in claim 17, further comprising a code portion configured for updating the mapping between the unique permanent identifier of the mobile data communication device and the mobile data communication device's IP address.

20. The non-transitory computer-accessible medium as set forth in claim 19, further comprising a code portion, responsive to updating the mapping between the unique permanent identifier of the mobile data communication device and the mobile data communication device's IP address, configured for setting an inactivity timer with respect to the mobile data communication device's IP address.

21. The non-transitory computer-accessible medium as set forth in claim 19, further comprising a code portion, responsive to updating the mapping between the unique permanent identifier of the mobile data communication device and the mobile data communication device's IP address, configured for setting an out-of-range timer with respect to the mobile data communication device's IP address.

22. The non-transitory computer-accessible medium as set forth in claim 17, wherein the mapping between the unique permanent identifier of the mobile data communication device and the phone number associated with the mobile data communication device is initialized based on information provided by the mobile data communication device to the store-and-forward server at startup.

23. The non-transitory computer-accessible medium as set forth in claim 17, wherein the phone number associated with the mobile data communication device is a Short Message Service (SMS) phone number.

24. The non-transitory computer-accessible medium as set forth in claim 17, wherein the unique permanent identifier of the mobile data communication device is at least one of a Personal Identification Number (PIN), International Mobile Subscriber Identity (IMSN) and Mobile Subscriber ISDN Number (MSISDN).

* * * * *